US012055873B2

(12) United States Patent
Fujishima et al.

(10) Patent No.: US 12,055,873 B2
(45) Date of Patent: Aug. 6, 2024

(54) IMAGE FORMING APPARATUS AND IMAGE FORMATION METHOD

(71) Applicant: KYOCERA Document Solutions Inc., Osaka (JP)

(72) Inventors: Masashi Fujishima, Osaka (JP); Tamotsu Shimizu, Osaka (JP); Asami Sasaki, Osaka (JP); Eriko Takeuchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/455,662

(22) Filed: Aug. 25, 2023

(65) Prior Publication Data

US 2024/0069469 A1 Feb. 29, 2024

(30) Foreign Application Priority Data

Aug. 31, 2022 (JP) ................................ 2022-138123

(51) Int. Cl.

| | |
|---|---|
| ***G03G 15/08*** | (2006.01) |
| ***G03G 9/08*** | (2006.01) |
| ***G03G 9/113*** | (2006.01) |
| ***G03G 15/09*** | (2006.01) |

(52) U.S. Cl.
CPC ....... *G03G 15/0891* (2013.01); *G03G 9/0823* (2013.01); *G03G 9/1139* (2013.01); *G03G 15/0898* (2013.01); *G03G 15/0907* (2013.01); *G03G 15/0848* (2013.01); *G03G 2215/0619* (2013.01); *G03G 2215/0634* (2013.01)

(58) Field of Classification Search
CPC ............... G03G 9/0823; G03G 9/1139; G03G 15/0891; G03G 15/0898; G03G 15/0907; G03G 15/0848; G03G 2215/0619; G03G 2215/0634
See application file for complete search history.

(56) References Cited

U.S. PATENT DOCUMENTS

| | | | |
|---|---|---|---|
| 5,339,141 A * | 8/1994 | Suzuki ............... | G03G 15/0818 399/285 |
| 2021/0063916 A1* | 3/2021 | Takei ................... | G03G 15/162 |
| 2023/0251587 A1* | 8/2023 | Anno ................... | G03G 9/1139 430/48 |

FOREIGN PATENT DOCUMENTS

JP 2013-109197 A 6/2013

* cited by examiner

*Primary Examiner* — Joseph S Wong
(74) *Attorney, Agent, or Firm* — Studebaker & Brackett PC

(57) ABSTRACT

An image forming apparatus includes a developer, a development device, and an image bearing member. The developer includes an initial developer containing an initial carrier and a replenishment developer containing a replenishment carrier. The initial carrier has a surface roughness Sa1 of at least 0.3 μm and no greater than 1.0 μm. A ratio Sa1/Sa2 of the surface roughness Sa1 of the initial carrier to a surface roughness Sa2 of the replenishment carrier is at least 1.2 and no greater than 3.4. The packing volume Vp calculated from equation (1)"Vp=100×Y/(Z×DS)" was at least 40% and no greater than 70%. In equation (1), Y represents an amount of the developer conveyed by a developer bearing member. Z represents an apparent density of the initial developer. DS represents a width of a space between the developer bearing member and the image bearing member.

9 Claims, 7 Drawing Sheets

IMAGE FORMING APPARATUS AND IMAGE FORMATION METHOD

INCORPORATION BY REFERENCE

The present application claims priority under 35 U.S.C. § 119 to Japanese Patent Application No. 2022-138123, filed on Aug. 31, 2022. The contents of this application are incorporated herein by reference in their entirety.

BACKGROUND ART

The present disclosure relates to an image forming apparatus and an image formation method.

Image forming apparatuses form images on a recording medium with a developer containing a toner and a carrier. Some carrier includes cores (carrier cores) different in shape each having a surface covered with a coat layer, for example. The arithmetic mean roughness coefficient of the surfaces of the carrier cores is at least 0.6 μm and no greater than 0.9 μm.

SUMMARY

An image forming apparatus according to an aspect of the present disclosure includes a developer, a development device that develops an electrostatic latent image into a toner image with the developer, and an image bearing member that carries the toner image. The developer includes an initial developer and a replenishment developer. The development device includes an accommodation section that accommodates the developer including at least the initial developer, a replenishment section that replenishes the accommodation section with the replenishment developer, and a developer bearing member that is located opposite to the image bearing member with a space therebetween and that carries and conveys the developer accommodated in the accommodation section. The initial developer contains an initial carrier and a toner. The replenishment developer contains a replenishment carrier and the toner. The initial carrier has a surface with an arithmetic mean roughness Sa1 of at least 0.3 μm and no greater than 1.0 μm. A ratio Sa1/Sa2 of the arithmetic mean roughness Sa1 of the surface of the initial carrier to an arithmetic mean roughness Sa2 of a surface of the replenishment carrier is at least 1.2 and no greater than 3.4. A packing volume Vp calculated from equation (1) below is at least 40% and no greater than 70%.

$$Vp=100\times Y/(Z\times DS) \quad (1)$$

In the equation (1), Y represents an amount of the developer conveyed by the developer bearing member. Z represents an apparent density of the initial developer. DS represents a width of the space between the developer bearing member and the image bearing member.

An image formation method according to another aspect of the present disclosure includes developing an electrostatic latent image formed on a surface of an image bearing member into a toner image with a developer accommodated in a development device.

The developer includes an initial developer and a replenishment developer. The development device includes an accommodation section that accommodates the developer including at least the initial developer, a replenishment section that replenishes the accommodation section with the replenishment developer, and a developer bearing member that is located opposite to the image bearing member with a space therebetween and that carries and conveys the developer in the accommodation section. The initial developer contains an initial carrier and a toner. The replenishment developer contains a replenishment carrier and the toner. The initial carrier has a surface with an arithmetic mean roughness Sa1 of at least 0.3 μm and no greater than 1.0 μm. A ratio Sa1/Sa2 of the arithmetic mean roughness Sa1 of the surface of the initial carrier to an arithmetic mean roughness Sa2 of a surface of the replenishment carrier is at least 1.2 and no greater than 3.4. A packing volume Vp calculated from equation (1) below is at least 40% and no greater than 70%.

$$Vp=100\times Y/(Z\times DS) \quad (1)$$

In the equation (1), Y represents an amount of the developer conveyed by the developer bearing member. Z represents an apparent density of the initial developer. DS represents a width of the space between the developer bearing member and the image bearing member.

DETAILED DESCRIPTION

Figure 1:
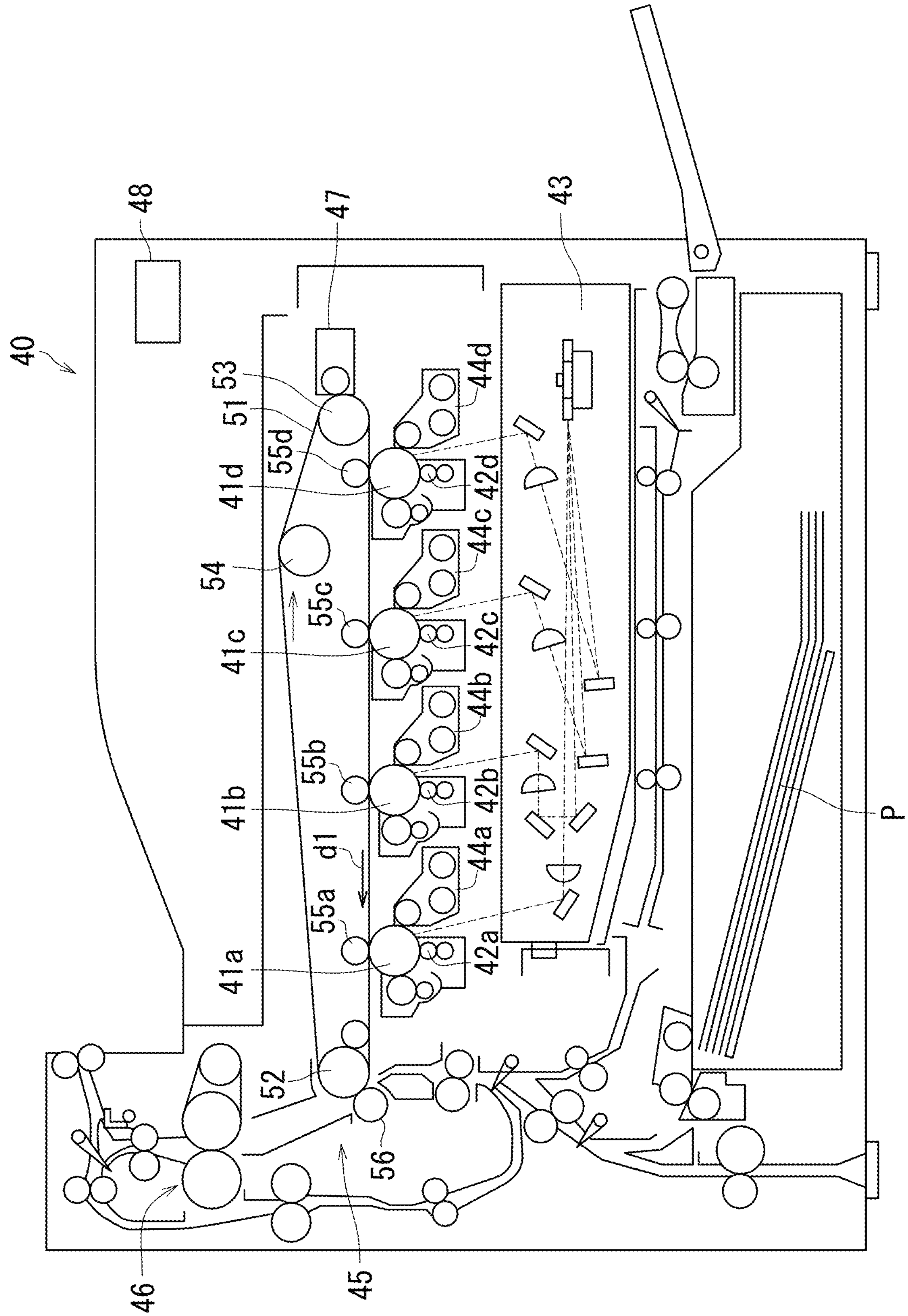
FIG. 1 is a diagram of an example of an image forming apparatus according to a first embodiment of the present disclosure.

The meaning of the terms used in the present specification and measurement methods are described first. A toner is a collection (e.g., a powder) of toner particles. An external additive is a collection (e.g., a powder) of external additive particles. A carrier is a collection (e.g., a powder) of carrier particles. Values indicating for example shape or property of a powder (specific examples include a powder of toner particles, a powder of external additive particles, and a powder of carrier particles) each are a number average of values as measured with respect to a suitable number of particles selected from the powder unless otherwise stated. The "main component" of a material means a component most abundant in the material in terms of mass unless otherwise stated. In the following description, the term "-based" may be appended to the name of a chemical compound to form a generic name encompassing both the chemical compound itself and derivatives thereof. When the term "-based" is appended to the name of a chemical compound to represent the name of a polymer, the term indicates that a repeating unit of the polymer originates from the chemical compound or a derivative thereof. The term "(meth)acryl" is used as a generic term for both acryl and methacryl. One type of each component described in the present specification may be used independently, or two or more types of the component may be used in combination.

Values for saturation magnetization means values as measured using a high sensitivity vibrating sample magnetometer ("VSM-P7", product of TOEI INDUSTRY CO., LTD.) under a condition of an external magnetic field of 3000 (unit: Oe) unless otherwise stated. Values for volume median diameter ($D_{50}$) of a powder each are a median diameter of the powder as measured using a laser diffraction/scattering type particle size distribution analyzer ("LA-950", product of HORIBA, Ltd.) unless otherwise stated. Unless otherwise stated, the number average primary particle diameter of a powder is a number average value of equivalent circle diameters (Heywood diameters: diameters of circles having the same areas as projected areas of the primary particles) of primary particles of the powder as measured using a scanning electron microscope. The number average primary particle diameter is a number average of equivalent circle diameters of 100 primary particles, for example. Values for softening point (Tm) are values as measured using a capillary rheometer ("CFT-500D", product of Shimadzu Corporation) unless otherwise stated. On an S-shaped curve (vertical axis: temperature, horizontal axis: stroke) plotted using the capillary rheometer, the softening point (Tm) corresponds to the temperature corresponding to a stroke value of "(base line stroke value+maximum stroke value)/2". Values for melting point (Mp) each are a temperature at a maximum endothermic peak on a heat absorption curve (vertical axis: heat flow (DSC signal), horizontal axis: temperature) plotted using a differential scanning calorimeter ("DSC-6220", product of Seiko Instruments Inc.) unless otherwise stated. The endothermic peak appears due to melting of the crystallization site. Values for glass transition point (Tg) are values as measured in accordance with "the Japanese Industrial Standards (JIS) K7121-2012" using a differential scanning calorimeter ("DSC-6220", product of Seiko Instruments Inc.) unless otherwise stated. The glass transition point corresponds to the temperature corresponding to a point of inflection (specifically, an intersection point of an extrapolated baseline and an extrapolated falling line) due to glass transition on a heat absorption curve (vertical axis: heat flow (DSC signal), horizontal axis: temperature) plotted using the differential scanning calorimeter. Values for acid value and values for hydroxyl value are values as measured in accordance with "the Japanese Industrial Standards (JIS) K0070-1992" unless otherwise stated. Values for mass average molecular weight (Mw) are values as measured using gel permeation chromatography unless otherwise state. Values for amount (unit: μC/g) of charge are values as measured using a compact suction-type charge measuring device (MODEL 212HS", product of TREK, INC.) in an environment at a temperature of 25° C. and a relative humidity of 50% unless otherwise stated. The meaning of the terms used in the present specification and the measurement methods have been explained so far.

[First Embodiment: Image Forming Apparatus]

The following describes an image forming apparatus according to a first embodiment of the present disclosure. With reference to FIG. 1, an image forming apparatus 40, which is an example of the image forming apparatus according to the first embodiment, is described below.

The image forming apparatus 40 illustrated in FIG. 1 includes a developer (an in-use developer D and a replenishment developer E, see FIG. 2), image bearing members 41*a* to 41*d*, chargers 42*a* to 42*d*, a light exposure device 43, development devices 44*a* to 44*d*, a transfer device 45, a fixing device 46, a cleaning device 47, and a controller 48. In the following, the image bearing members 41*a* to 41*d* are each referred to as image bearing member 41, the chargers 42*a* to 42*d* are each referred to as charger 42, and the development devices 44*a* to 44*d* are each referred to as development device 44 where there is no need to distinguish them.

The developer includes an in-use developer D and a replenishment developer E. The in-use developer D includes at least an initial developer. The initial developer contains an initial carrier and a toner. The replenishment developer E contains a replenishment carrier and the toner. The initial developer and the replenishment developer E each are a two-component developer.

Each of the image bearing members 41 is cylindrical in shape. The image bearing member 41 includes a metal-made cylindrical body (e.g., a cylindrical conductive substrate) as a support body. The image bearing member 41 includes a photosensitive layer located around the support body thereof. The image bearing member 41 is supported in a rotatable manner. The image bearing member 41 is rotationally driven by a motor (not illustrated). The image bearing member 41 is an amorphous silicon photosensitive member, for example. The amorphous silicon photosensitive member includes a photosensitive layer containing amorphous silicon.

Each of the chargers 42 charges the circumferential surface of a corresponding one of the image bearing members 41.

The light exposure device 43 irradiates the charged circumferential surfaces of the image bearing members 41 with light to form electrostatic latent images on the circumferential surfaces of the image bearing members 41. For example, the electrostatic latent images are formed on the surface layer portions (photosensitive layers) of the image bearing members 41 based on image data.

The development devices 44 develop the electrostatic latent images into toner images with the in-use developer D. More specifically, the development devices 44 develop the electrostatic latent images formed on the circumferential surfaces of the image bearing members 41 into toner images with the in-use developer D. As a result, the image bearing members 41 carry the toner images on the circumferential surfaces thereof. The development devices 44 are described later in detail.

The transfer device 45 includes a transfer belt 51, a drive roller 52, a driven roller 53, a tension roller 54, primary transfer rollers 55*a* to 55*d*, and a secondary transfer roller 56. In the following, the primary transfer rollers 55*a* to 55*d* each are referred to as primary transfer roller 55 where there is no need to distinguish them. The transfer belt 51 is an endless belt would among the drive roller 52, the driven roller 53, and the tension roller 54. Rotation of the drive roller 52 causes circulation of the transfer belt 51 in the clockwise direction (arrow direction d1 in FIG. 1) in FIG. 1. The driven roller 53 and the tension roller 54 are rotationally driven by circulation of the transfer belt 51.

Bias (voltage) application to the primary transfer roller 55*a* to the primary transfer roller 55*d* after formation of the toner images on the image bearing member 41*a* to the image bearing member 41*d* primarily transfers toner (toner images) attached to the image bearing member 41*a* to the image bearing member 41*d* to the transfer belt 51 in a sequential manner. In the manner described above, the toner images with multiple colors are superimposed. After primary transfer, bias (voltage) is applied to the secondary transfer roller 56, thereby secondarily transferring the toner images with multiple colors on the transfer belt 51 to a recording medium P (e.g., printing paper) that is being conveyed. As a result, the toner images with multiple colors superimposed on the transfer belt 51 are secondary transferred in a batch to the recording medium P. In the manner described above, an image constituted by unfixed toner is formed on the recording medium P.

After secondary transfer, the fixing device 46 applies heat and pressure to the toner on the recording medium P to fix the toner to the recording medium P. In the manner described above, an image constituted by the fixed toner is formed on the recording medium P.

The cleaning device 47 cleans toner remaining on the transfer belt 51 after secondary transfer.

The controller 48 electronically controls operation of the image forming apparatus 40 based on outputs from various sensors. The controller 48 includes a central processing unit (CPU), random-access memory, and a storage device that stores programs therein and that stores specific data therein in a rewritable manner, for example. A user provides an instruction (e.g., an electric signal) to the controller 48 through an input section (not illustrated). The input section is a keyboard, a mouse, or a touch panel, for example.

<Development Device>

Figure 2:
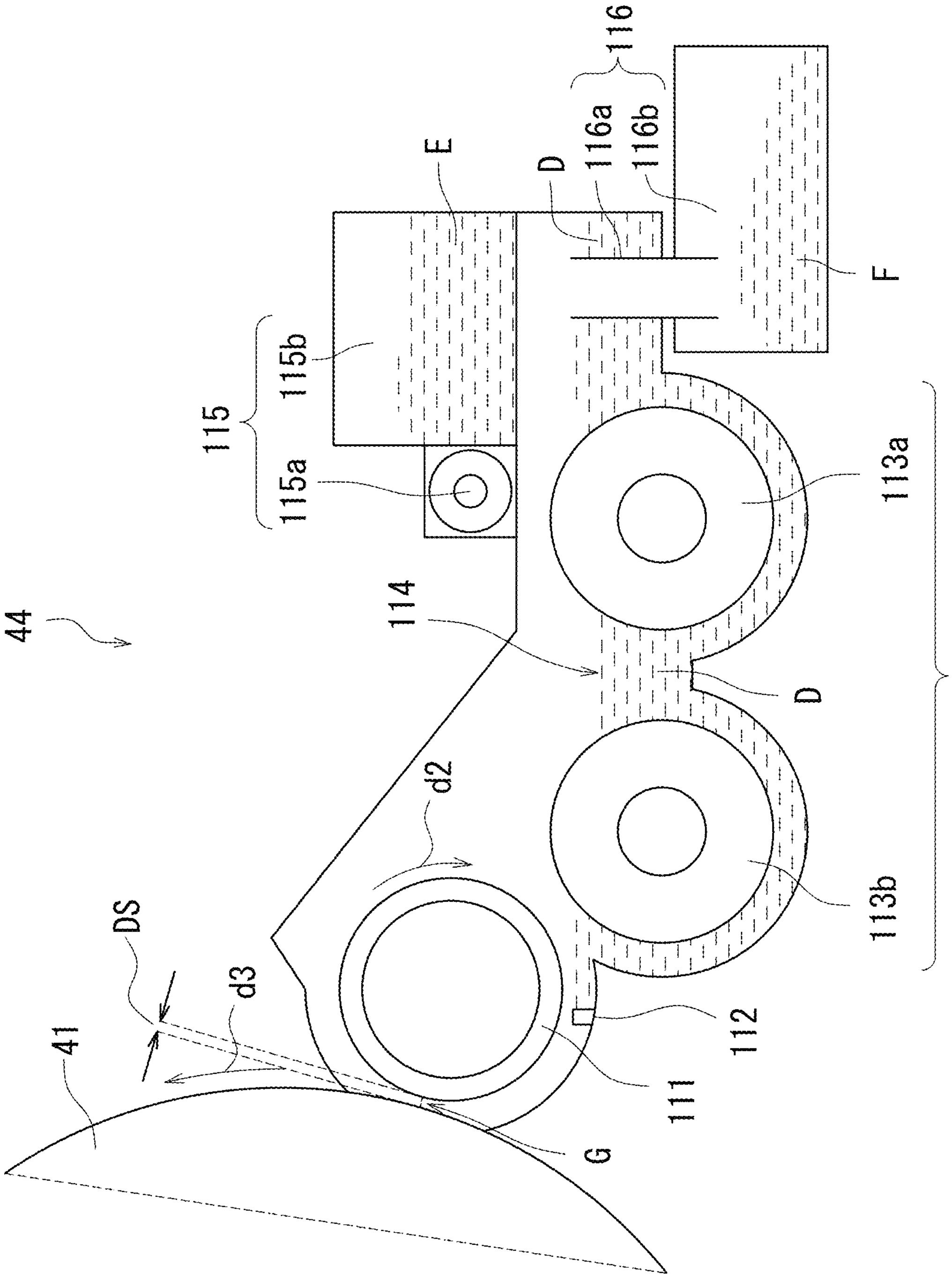
FIG. 2 is a diagram illustrating an example of a development device and its surroundings of the image forming apparatus illustrated in FIG. 1.

With reference to FIG. 2, the development devices 44 of the image forming apparatus 40 are described next in detail. FIG. 2 illustrates a development device 44 and its surroundings of the image forming apparatus 40 illustrated in FIG. 1. The development device 44 includes at least a developer bearing member 111, an accommodation section 114, and a replenishment section 115. The development device 44 further includes a restriction blade 112, a plurality of stirring shafts 113, and a discharge section 116.

The accommodation section 114 accommodates the in-use developer D (i.e., an accommodated developer) and the stirring shafts 113. The in-use developer D accommodated in the accommodation section 114 includes at least the initial developer. The stirring shafts 113 include a first stirring shaft 113*a* and a second stirring shaft 113*b*. The first stirring shaft 113*a* includes a spiral stirring vane. The second stirring shaft 113*b* includes a spiral stirring vane that faces in the opposite direction (opposite phase) to the direction in which the spiral stirring vane of the first stirring shaft 113*a* faces. The first stirring shaft 113*a* conveys the in-use developer D in a first conveyance direction (direction perpendicular to the paper surface of FIG. 2 and a direction from the back to the front of the paper) from one end to the other end of the developer bearing member 111 in the axial direction while stirring the in-use developer D in the accommodation section 114. The second stirring shaft 113*b* conveys the in-use developer D in a second conveyance direction opposite to the first conveyance direction while stirring the in-use developer D in the accommodation section 114. When the in-use developer D containing the toner and the carrier is stirred, the toner is charged by friction with the carrier and the charged toner is carried by the carrier. The second stirring shaft 113*b* supplies the in-use developer D to the developer bearing member 111 while conveying the in-use developer D in the second conveyance direction.

The replenishment section 115 is located above the accommodation section 114. The replenishment section 115 replenishes the accommodation section 114 with the replenishment developer E. The replenishment section 115 includes a replenishment amount adjusting member 115*a* and a developer container 115*b*.

The replenishment amount adjusting member 115*a* controls the replenishment amount of the replenishment developer E to be supplied from the developer container 115*b* to the accommodation section 114. The replenishment amount adjusting member 115*a* is constituted by a screw shaft of which rotation operation is controlled by the controller 48, for example. For example, the replenishment amount of the replenishment developer E can be changed according to the amount of rotation of the screw shaft.

The developer container 115*b* accommodates the replenishment developer E. The replenishment developer E in the developer container 115*b* is supplied to the accommodation section 114.

The in-use developer D in the accommodation section 114 is discharged to the discharge section 116. The discharge section 116 includes a discharge path 116*a* and a collection container 116*b*. The discharge path 116*a* connects the accommodation section 114 and the collection container 116*b*. When the amount of the in-use developer D in the accommodation section 114 exceeds a specific amount, excess in-use developer D flows into the discharge path 116*a* from an opening at the upper end of the discharge path 116*a*. The specific amount is an amount determined according to the position of the upper end of the discharge path 116*a*, for example. The amount of the excess in-use developer D is the amount of the in-use developer D that exceeds the specific amount, for example. The excess in-use developer D, having entered the discharge path 116*a*, moves downward in the discharge path 116*a* due to its own weight and flows into the collection container 116*b*. Thereafter, the excess in-use developer D is collected in the collection container 116*b*. In the following, the developer collected may be also referred to below as collected developer F.

In a non-used image forming apparatus 40 (e.g., an image forming apparatus 40 after factory shipping and before printing start), the in-use developer D accommodated in the accommodation section 114 is the initial developer.

After start of use (e.g., after printing start) of the image forming apparatus 40 and before the replenishment section 115 replenishes the accommodation section 114 with the replenishment developer E, the in-use developer D accommodated in the accommodation section 114 is the initial developer. In the accommodation section 114, the stirring shafts 113 stir the initial developer to frictionally charge the toner contained in the initial developer. Thereafter, the stirred initial developer is carried by the developer bearing member 111.

When printing by the image forming apparatus 40 is continued, replenishment of the accommodation section 114 with the replenishment developer E and discharge of the in-use developer D from the accommodation section 114 are performed. As such, when printing by the image forming apparatus 40 is continued, the in-use developer D accommodated in the accommodation section 114 is replaced with the replenishment developer E supplied from the replenishment section 115 little by little. Accordingly, once the replenishment section 115 replenishes the accommodation section 114 with the replenishment developer E, the in-use developer D accommodated in the accommodation section 114 includes the initial developer and the replenishment developer E. After the replenishment section 115 replenishes the accommodation section 114 with the replenishment developer E, the initial developer and the replenishment developer E are stirred by the stirring shafts 113 in the accommodation section 114 to frictionally charge the toner contained in the initial developer and the toner contained in the replenishment developer E. As a result, the stirred initial developer and replenishment developer E are carried by the developer bearing member 111.

The development device 44 is a development device 44 of trickle development type including the accommodation section 114, the replenishment section 115, and the discharge section 116. The development device 44 of trickle development type starts development of an electrostatic latent image with the initial developer accommodated in the accommodation section 114, and then develops the electrostatic latent image with the in-use developer D accommodated in the accommodation section 114 while performing discharge of the in-use developer D in the accommodation section 114 and replenishment of the accommodation section 114 with the replenishment developer E. During image formation, the accommodation section 114 is replenished with the carrier together with the toner, and the carrier in an excess replenishment amount is discharged. This can inhibit degradation of the carrier in the accommodation section 114. As such, as a result of degradation of the carrier being inhibited, the number of times of replacement of the carrier in the development device 44 can be reduced.

The developer bearing member 111 is located opposite to the image bearing member 41 with a space G therebetween. The space G is a space G in the most proximal part between the developer bearing member 111 and the image bearing member 41. In the following, the "space G between the developer bearing member 111 and the image bearing member 41" may be also referred to below as "gap G". The developer bearing member 111 includes a magnet roll and a development sleeve. The magnet roll has NS magnetic poles at at least a surface layer portion thereof. The NS magnetic poles includes an N pole and an S pole based on a permanent magnet, for example. The development sleeve is a non-magnetic cylinder (e.g., an aluminum pipe). The magnet roll is located within the development sleeve (cylinder), and the development sleeve is located in the surface layer portion of the developer bearing member 111. The development sleeve and the shaft of the magnet roll are connected to each other through a flange so that the development sleeve rotates around the magnet roll which is nonrotatable.

As described previously, the charged toner is carried by the carrier in the accommodation section 114. The developer bearing member 111 (specifically, the development sleeve) attracts the carrier accommodated in the accommodation section 114 by the magnetic force thereof while rotating in the clockwise direction in FIG. 2 (arrow direction d2 in FIG. 2) to carry, on the circumferential surface thereof, chains (i.e., a magnetic brush of the in-use developer D) of the carrier particles carrying the toner particles. In the manner described above, the developer bearing member 111 carries the in-use developer D in the accommodation section 114 and conveys the in-use developer D in the arrow direction d2.

The restriction blade 112 restricts the thickness of the magnetic brush of the in-use developer D formed on the circumferential surface of the developer bearing member 111 to a specific thickness.

After the thickness of the magnetic brush is restricted by the restriction blade 112, the developer bearing member 111 (specifically, the development sleeve) further rotates in the clockwise direction in FIG. 2 (arrow direction d2 in FIG. 2) to convey the in-use developer D to the gap G between the image bearing member 41 and the developer bearing member 111. The image bearing member 41 rotates in the anticlockwise direction in FIG. 2 (arrow direction d3 in FIG. 2). Bias (voltage) application to the developer bearing member 111 generates a potential difference between the surface potential of the developer bearing member 111 and the surface potential of the image bearing member 41. Due to presence of the potential difference, the toner contained in the in-use developer D carried by the developer bearing member 111 moves to the circumferential surface of the image bearing member 41. In detail, the charged toner contained in the in-use developer D carried by the developer bearing member 111 is attracted to an electrostatic latent image (e.g., an exposed part of which potential is reduced by light exposure to be lower than that of the non-exposed part) by electric force to move to the electrostatic latent image on the image bearing member 41. As a result, a toner image is formed on the circumferential surface of the image bearing member 41.

<Developer>

The developer in the image forming apparatus 40 is described next further in detail. As described previously, the developer includes an in-use developer D and a replenishment developer E. The in-use developer D includes at least an initial developer.

In order to inhibit carrier development, the initial carrier contained in the initial developer has a surface with an arithmetic mean roughness Sa1 of at least 0.3 μm and no greater than 1.0 μm. Note that values of Sa1 and Sa2 and Sa1/Sa2 which are described later are values rounded off to the second decimal place. In the following, the "arithmetic mean roughness Sa1 of the surface" of the initial carrier may be also referred to below as "surface roughness Sa1" of the initial carrier.

Carrier development is a defect in which the carrier particles in the magnetic brush (i.e., chains of carrier particles carrying toner particles) carried by the developer bearing member 111 moves to the image bearing member 41. The carrier particles, once moved to the image bearing member 41, hardly return to the developer bearing member 111 due to their high attaching strength. The carrier particles having moved to the image bearing member 41 serve as a cause of white spots or black spots in formed images.

The strength of the magnetic brush is affected by frictional force between the carrier particles. For example, when the developer bearing member 111 and the image bearing member 41 rotate in the same direction in the gap G, the tip end of the magnetic brush carried on the developer bearing member 111 may be attracted toward the image bearing member 41 in the gap G. When the frictional force between the carrier particles is weak, the tip end of the magnetic brush is attracted to the image bearing member 41 in the gap G and easily cut around the tip end thereof. As such, the cut tip end of the magnetic brush moves to the image bearing member 41 to cause carrier development. Frictional force between the carrier particles (e.g., the first carrier particles) tends to be affected by the surface roughness Sa1 of the initial carrier. For example, the smaller the surface roughness Sa1 of the initial carrier is, the smaller frictional force between the carrier particles (e.g., the first carrier particles) tends to be.

When the surface roughness Sa1 of the initial carrier is less than 0.3 μm, frictional force between the carrier particles (e.g., the first carrier particles) is weak. As such, the magnetic brush is easily cut around the tip end thereof and the cut tip end moves to the image bearing member 41 to cause carrier development.

When the surface roughness Sa1 of the initial carrier is greater than 1.0 μm by contrast, frictional force between the carrier particles (e.g., the first carrier particles) is strong. However, when frictional force is excessively strong, the distance between the carrier particles (e.g., the first carrier particles) in the magnetic brush increases, thereby easily cutting the magnetic brush. As such, the cut tip end of the magnetic brush moves to the image bearing member 41 to cause carrier development.

In order to inhibit occurrence of carrier development, the surface roughness Sa1 of the initial carrier is preferably at least 0.5 μm and no greater than 0.9 μm, and more preferably at least 0.5 μm and no greater than 0.8 μm.

In order to inhibit occurrence of carrier development, the arithmetic mean roughness Sa2 of the surface of the replenishment carrier is preferably at least 0.09 μm and no greater than 0.83 μm, and more preferably at least 0.32 μm and no greater than 0.83 μm. In the following, the "arithmetic mean roughness Sa2 of the surface" of the replenishment carrier may be also referred to below as "surface roughness Sa2" of the replenishment carrier.

The ratio Sa1/Sa2 of the surface roughness Sa1 of the initial carrier to the surface roughness Sa2 of the replenishment carrier is at least 1.2 and no greater than 3.4. In the following, the "ratio Sa1/Sa2 of the surface roughness Sa1 of the initial carrier to the surface roughness Sa2 of the replenishment carrier" may be also referred to below as "ratio Sa1/Sa2".

Here, it is possible that the tip end of the magnetic brush carried by the developer bearing member 111 comes in contact with a toner image formed on the circumferential surface of the image bearing member 41 in the gap G. The trailing edge (downstream edge in the rotation direction of the image bearing member 41) of the toner image formed on the circumferential surface of the image bearing member 41 tends to be more strongly scraped off by the magnetic blush than the leading edge thereof. As a result, artifact of arrangement of the toner particles in the toner image formed on the circumferential surface of the image bearing member 41 may be caused by the magnetic brush coming into contact therewith, thereby causing trailing edge image roughness. Trailing edge image roughness is a defect in which an image artifact appears at the trailing edge of the image formed on a recording medium P. When the ratio Sa1/Sa2 is at least 1.2, the surface roughness Sa2 of the replenishment carrier is sufficiently lower than the surface roughness Sa1 of the initial carrier. As the number of sheets printed is increased and the percentage content of the replenishment carrier included in the carrier in the accommodation section 114 increases, the average of the surface roughness of the carrier as a whole in the accommodation section 114 decreases. As a result, force of the magnetic brush scraping off the trailing edge of the toner image formed on the circumferential surface of the image bearing member 41 becomes weak. Accordingly, trailing edge image roughness can be inhibited even when a large number of sheets are printed.

By contrast, when the ratio Sa1/Sa2 is greater than 3.4, the surfaces of the first carrier particles included in the initial carrier excessively increases with a result that the first carrier particles in the magnetic brush are readily caught by the image bearing member 41 in the gap G. As a result, carrier development occurs.

The following describes a method for measuring the arithmetic mean roughness Sa of the surface of the carrier (also referred to below as surface roughness Sa of the carrier). The surface roughness Sa of the carrier (e.g., the surface roughness Sa1 of the initial carrier or the surface roughness Sa2 of the replenishment carrier) is measured by a method in compliance with ISO 25178, for example.

The surface roughness Sa1 of the initial carrier, the surface roughness Sa2 of the replenishment carrier, and the ratio Sa1/Sa2 are each obtained by measuring the arithmetic mean roughness of the outermost surfaces of the carrier particles. In a case in which the carrier particles each include a coat layer, measurement is done after coating with the coat layers, not before coating with the coat layers. Therefore, the behavior of the carrier after coating can be favorably controlled.

Note that as to the carrier described in BACKGROUND ART, the arithmetic mean roughness coefficient of the surfaces of the carrier cores, rather than the surface of the carrier, is at least 0.6 μm and no greater than 0.9 μm. However, even use of the carrier cores with an arithmetic mean roughness coefficient of at least 0.6 μm and no greater than 0.9 μm makes behavior of the coated carrier different when a condition for coating the coat layers differs. Therefore, the carrier described in BACKGROUND ART are poor in inhibition of carrier development and formation of fine-grained images with less trailing edge image roughness and less pitch unevenness.

A packing volume Vp calculated from the following equation (1) using the apparent density Z of the initial developer is at least 40% and no greater than 70%. In equation (1), Y represents an amount (unit: mg/cm$^2$) of the in-use developer D conveyed by the developer bearing member 111. Z represents an apparent density (unit: mg/cm$^3$) of the initial developer. DS represents a width (unit: cm) of the gap G (i.e., the space between the developer bearing member 111 and the image bearing member 41).

$$Vp=100\times Y/(Z\times DS) \quad (1)$$

The packing volume Vp is an indicator of the amount of the in-use developer D (magnetic brush) present in a development area. The development area is an area where the image bearing member 41 is opposite to the developer bearing member 111.

When the packing volume Vp is less than 40%, the distance between bristles of the magnetic brush formed on the circumferential surface of the developer bearing member 111 increases to decrease grain fineness of formed images. When the packing volume Vp is greater than 70% by contrast, density of the magnet brush is readily affected by influence of variation in the width DS of the gap G that is caused due to vibration of the rotational axis of the image bearing member 41 and vibration of the rotational axis of the developer bearing member 111. Variation in the width DS of the gap G generates a difference in density of the magnetic brush in the development area to cause pitch unevenness in formed images. In order to form fine-grained images, the packing volume Vp is preferably at least 45%. In order to form images with less pitch unevenness, the packing volume Vp is preferably no greater than 68%.

The amount Y of the in-use developer D conveyed by the developer bearing member 111 corresponds to the mass of the in-use developer D (magnetic brush) present per unit area of the circumferential surface of the developer bearing member 111 in the developing area. The amount Y of the in-use developer D conveyed by the developer bearing member 111 can be set by providing an instruction (e.g., an electric signal) to the controller 48 through an input section (not illustrated). The amount Y of the in-use developer D conveyed by the developer bearing member 111 is preferably at least 16.0 mg/cm$^2$ and no greater than 36.0 mg/cm$^2$.

The width DS of the gap G is preferably at least 0.01 cm and no greater than 0.10 cm, and more preferably at least 0.01 cm and no greater than 0.05 cm.

The apparent density Z of the initial developer is measured by a method in compliance with the Japanese Industrial Standards (JIS) Z2504 (Metallic powders-Determination of apparent density). The apparent density Z of the initial developer is preferably at least 1000 mg/$cm^3$ and no greater than 2000 mg/$cm^3$.

In order to favorably form fine-grained images with less pitch unevenness even when a large number of sheets are printed, a packing volume Vpb that is calculated from the following equation (2) using an apparent density Zb of the replenishment developer E is preferably at least 40% and no greater than 70%. Zb in equation (2) represents an apparent density (unit: mg/$cm^3$) of the replenishment developer E. Y and DS in equation (2) are the same as defined for Y and DS in equation (1), respectively.

$$Vpb=100\times Y/(Zb\times DS) \quad (2)$$

The apparent density Zb of the replenishment developer E is measured by the same method as that for measuring the apparent density Z of the initial developer. The apparent density Zb of the replenishment developer E is preferably at least 1000 mg/$cm^3$ and no greater than 2000 mg/$cm^3$. When the surface roughness Sa1 of the initial carrier and the surface roughness Sa2 of the replenishment carrier are adjusted according to the content of later-described ferroelectric particles contained, the apparent density Zb of the replenishment developer E is preferably lower than the apparent density Z of the initial developer.

It is only required that the surface roughness Sa1 of the initial carrier, the ratio Sa1/Sa2, and the packing volume Vp are in the respective specific ranges at least when the image forming apparatus 40 is not used yet (e.g., after factory shipping and before printing start). Furthermore, the surface roughness Sa1 of the initial carrier, the ratio Sa1/Sa2, and the packing volume Vp are preferably in the respective specific ranges even after printing start of the image forming apparatus 40.

<Image Bearing Member>

The image bearing member 41 of the image forming apparatus 40 is described next further in detail. The surface (e.g., the circumferential surface) of the image bearing member 41 preferably has an arithmetic mean roughness Ra of at least 40 nm and no greater than 70 nm. In the following, the "arithmetic mean roughness Ra of the surface" of the image bearing member 41 may be also referred to below as "surface roughness Ra" of the image bearing member 41.

The surface roughness Ra of the image bearing member 41 is measured by a method in compliance with the Japanese Industrial Standards (JIS) B0601 (Geometrical Product Specifications (GPS)—Surface texture: Profile method—Terms, Definitions and surface texture parameters). The surface roughness Ra of the image bearing member 41 can be adjusted by surface treatment of the image bearing member 41 by any known method, for example. For example, the surface roughness Ra of the image bearing member 41 can be adjusted by changing treatment conditions (specific examples include pressure to inject a medium (abrasive grains), the distance between the medium injection port and the surface of the image bearing member 41, and the shape and material of the medium) in blasting the image bearing member 41.

As illustrated in FIG. 2, in a case in which the surface roughness Ra of the image bearing member 41 is at least 40 nm and no greater than 70 nm, the tip end of the magnetic brush formed on the developer bearing member 111 easily pass through the gap G when the developer bearing member 111 and the image bearing member 41 rotate in the same direction in the gap G.

As a result of the surface roughness Ra of the image bearing member 41 being set to at least 40 nm, the contact area of the carrier particles in contact with the surface of the image bearing member 41 is reduced to reduce adhesion of the carrier particles to the image bearing member 41. As a result, carrier development hardly occurs. Furthermore, as a result of the surface roughness Ra of the image bearing member 41 being set to at least 40 nm, the surface roughness Ra of the image bearing member 41 will not be excessively small even when a large number of sheets are printed. As such, frictional force between a cleaning blade (not illustrated) and the image bearing member 41 can be reduced to hardly cause turning-up of the cleaning blade. When the surface roughness Ra of the image bearing member 41 is no greater than 70 nm, the space between the cleaning blade (not illustrated) and the image bearing member 41 is appropriately small. Accordingly, cleaning defects caused by the external additive of the toner passing through the space can be inhibited to inhibit contamination of the charger 42 in association therewith.

The surface roughness Ra of the image bearing member 41 is preferably at least 40 nm and no greater than 70 nm at least when the image bearing member 41 is not used yet (e.g., after factory shipping and before printing start). Furthermore, the surface roughness Ra of the image bearing member 41 is further preferably in the above range also in the image bearing member 41 after printing start.

The image forming apparatus 40 according to the first embodiment has been described so far with reference to FIGS. 1 and 2. However, the image forming apparatus according to the first embodiment is not limited to the above image forming apparatus 40 and may be implemented in various manners within a scope not departing from the gist thereof. For example, some elements of configuration may be omitted from all the elements of configuration. Properties such as material, shape, and dimension of each element of configuration are merely examples and not particularly limited, and may be altered in various manners. The image forming apparatus 40 is a tandem image forming apparatus as an example. However, the present disclosure is also applicable to monochrome printers and rotary color printers, for example. Furthermore, the present disclosure is also applicable to image forming apparatuses such as copiers, facsimile machines, and multifunction peripherals having these functions. Furthermore, the image forming apparatus may further include a cleaning member that cleans the surfaces of the image bearing members. Furthermore, the image bearing members of the image forming apparatus may be in the form of a plate or an endless belt. Furthermore, the image bearing members of the image forming apparatus may each include an electrical charge injection preventing layer that prevents charge injection from the support body in addition to the core and the photosensitive layer. Furthermore, the image bearing members of the image forming apparatus may be organic photosensitive members.

[Second Embodiment: Image Formation Method]

The following describes an image formation method according to a second embodiment of the present disclosure with further reference to FIGS. 1 and 2. The image formation method according to the second embodiment includes developing. In the developing, an electrostatic latent image formed on the surface of an image bearing member 41 is developed into a toner image with a developer accommodated in a development device 44. The developer includes an initial developer and a replenishment developer E. The development device 44 includes an accommodation section 114, a replenishment section 115, and a developer bearing member 111. The accommodation section 114 accommodates a developer (e.g., an in-use developer D) including at least the initial developer. The replenishment section 115 replenishes the accommodation section 114 with the replenishment developer E. The developer bearing member 111 is located opposite to the image bearing member 41 with a space (gap G) therebetween. The developer bearing member 111 carries and conveys the developer (e.g., the in-use developer D) accommodated in the accommodation section 114. The initial developer includes an initial carrier and a toner. The replenishment developer E includes a replenishment carrier and the toner. The initial carrier has a surface with a surface roughness Sa1 (i.e., the arithmetic mean roughness Sa1 of the surface of the initial carrier) of at least 0.3 μm and no greater than 1.0 μm. The ratio Sa1/Sa2 (i.e., the ratio Sa1/Sa2 of the arithmetic mean roughness Sa1 of the surface of the initial carrier to the arithmetic mean roughness Sa2 of the surface of the replenishment carrier) is at least 1.2 and no greater than 3.4. A packing volume Vp calculated from the following equation (1) is at least 40% and no greater than 70%.

$$Vp=100\times Y/(Z\times DS) \quad (1)$$

In equation (1), Y represents an amount of the developer (e.g., the in-use developer D) conveyed by the developer bearing member 111. Z represents an apparent density of the initial developer. DS represents a width of the space (i.e., the gap G) between the developer bearing member 111 and the image bearing member 41.

The image formation method according to the second embodiment is implemented by the image forming apparatus 40 according to the first embodiment, for example. As such, in the image formation method according to the second embodiment, fine-grained images with less trailing edge image roughness and less pitch unevenness can be formed and occurrence of carrier development can be inhibited for the same reasons as those described in the first embodiment. The image formation method according to the second embodiment has been described so far with reference to FIGS. 1 and 2.

[Initial Carrier Contained in Initial Developer]

The initial carrier contained in the initial developer in the image forming apparatus according to the first embodiment and the initial carrier contained in the initial developer used in the image formation method according to the second embodiment are described next. The initial carrier contains first carrier particles. Preferably, the first carrier particles each include a carrier mother particle and ferroelectric particles attached to the surface of the carrier mother particle. In the following, the "ferroelectric particles attached to the surfaces of the carrier mother particles" may be also referred to below as "first ferroelectric particles".

As a result of the first ferroelectric particles attaching to the surfaces of the carrier mother particles, the first carrier particles have rough outermost surfaces. Accordingly, the surface roughness Sa1 of the initial carrier can be easily adjusted within the specific range. Furthermore, a carrier that can charge a toner to a specific amount of charge can be more easily produced in the method for attaching the first ferroelectric particles to the carrier mother particles as a method for increasing the surface roughness Sa1 of the initial carrier than in a method in which the baking temperature of the carrier or the material of the coat layers is changed. Furthermore, variation in amount of charge of the toner caused due to attachment of the external additive of the toner to the carrier can be reduced.

In terms of easy adjustment of the surface roughness Sa1 of the initial carrier within the specific range, the content ratio of the first ferroelectric particle in the first carrier particles is preferably at least 0.02 parts by mass and no greater than 0.22 parts by mass to 100.00 parts by mass of the carrier mother particles.

Figure 3:
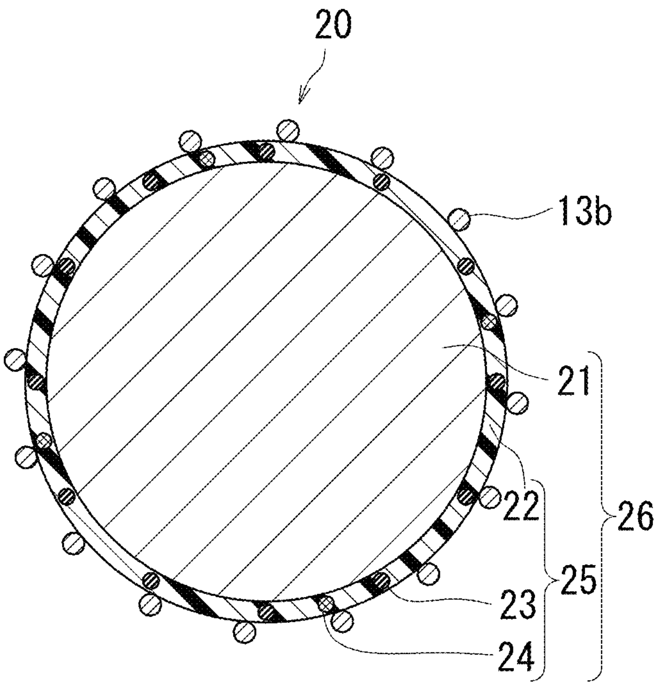
FIG. 3 is a cross-sectional view of an example of a first carrier particle contained in an initial carrier that is contained in an initial developer in the image forming apparatus according to the first embodiment of the present disclosure.

One example of the structure of the first carrier particles is described below with reference to FIG. 3. FIG. 3 is a cross-sectional view of an example of a first carrier particle 20 contained in the initial developer. The first carrier particle 20 illustrated in FIG. 3 includes a carrier mother particle 26 and ferroelectric particles **13*b*. The ferroelectric particles 13*b* are attached to (provided on) the surface of the carrier mother particle 26. In the following, the ferroelectric particles 13*b* attached to the surface of the carrier mother particle 26 may be also referred to below as "first ferroelectric particles 13*b*". The first ferroelectric particles 13*b* are attached to the outer surface of a coat layer rather than the inside of the coat layer 25. The first ferroelectric particles 13*b* are located on the outermost surface of the first carrier particle 20. The carrier mother particle 26 includes a carrier core 21 and the coat layer 25. The coat layer 25 coats the surface of the carrier core 21. For example, the coat layer 25 coats the entire surface of the carrier core 21. The coat layer 25 contains ferroelectric particles 23 and a coating resin forming a coating resin area 22. In the following, the "ferroelectric particles 23 contained in the coat layer 25" may be also referred to below as "second ferroelectric particles 23". The coat layer 25 may further contain carbon black particles 24** as necessary.

Figure 4:
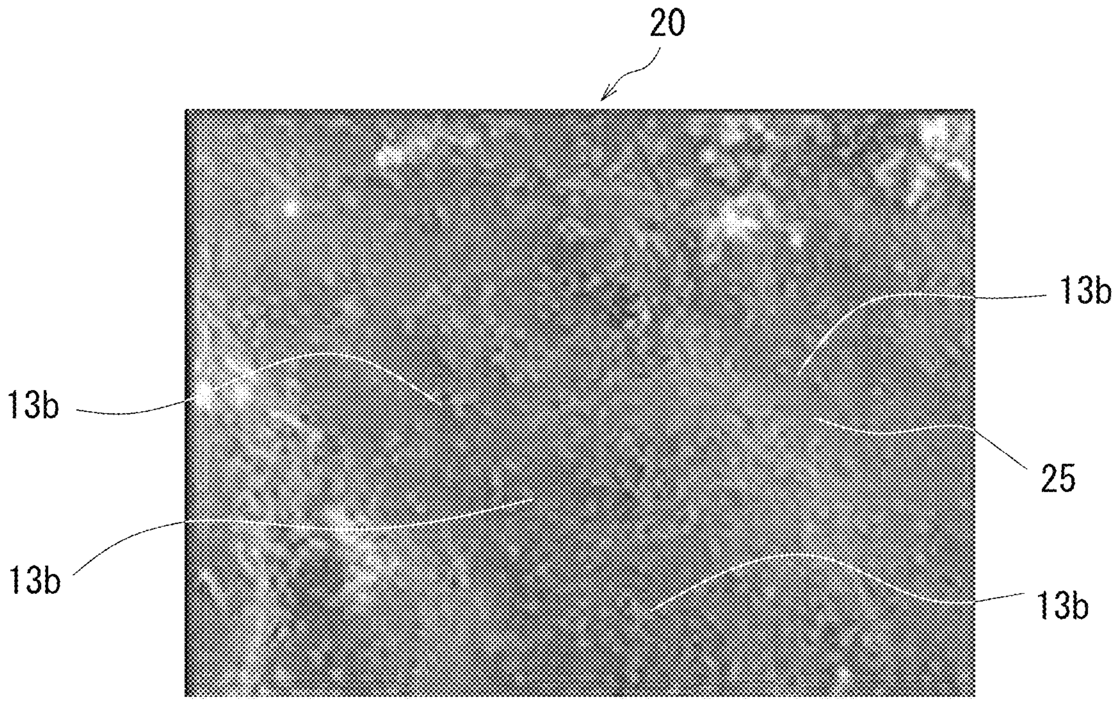
FIG. 4 is a microphotograph of the surface of the first carrier particle illustrated in FIG. 3.

Description of the example of the structure of the first carrier particles 20 contained in the initial developer is continued with further reference to FIG. 4. FIG. 4 is a microphotograph of the surface of the first carrier particle 20 illustrated in FIG. 3. The microphotograph of FIG. 4 is taken through observation of the surface of the first carrier particle 20 at a magnification for observation of 1800×using a three-dimensional microscope ("OPTELICS HYBRID (mc2000), product of Lasertec). As shown in FIG. 4, it is confirmed that the first ferroelectric particles **13*b* are attached to the surface of the coat layer 25 (corresponding to the surface of the carrier mother particle 26**).

An example of the structure of the first carrier particles contained in the initial developer has been described so far with reference to FIGS. 3 and 4. However, the structure of the first carrier particles contained in the initial developer is not limited particularly and may differ from that of the first carrier particle 20 illustrated in FIG. 3. For example, it is only required that the coat layer of the first carrier particle coats at least a part of the carrier core. That is, a part of the carrier core may be exposed. Furthermore, the coat layers of the first carrier particles may not contain either or both the second ferroelectric particles and the carbon black particles. Furthermore, the first carrier particles may not include the coat layers. Furthermore, it is possible that the first carrier particles do not include the first ferroelectric particles and the surface roughness Sa1 of the initial carrier is adjusted by another method. The initial carrier is described next further in detail.

<External Additive Particles of First Carrier Particles>

Examples of external additive particles of the first carrier particles contained in the initial carrier include the first ferroelectric particles and an external additive (also referred to below as different carrier external additive particles) other than the first ferroelectric particles.

(First Ferroelectric Particles)

Examples of ferroelectric constituting the first ferroelectric particles include titanate compounds. The first ferroelectric particles are titanate compound particles, for example. A titanate compound is a compound containing at least titanium, oxygen, and a metal element other than titanium. Examples of the titanate compounds include strontium titanate ($SrTO_3$), barium titanate ($BaTiO_3$), calcium titanate ($CaTO_3$), magnesium titanate ($MgTiO_3$), and lead titanate ($PbTO_3$). The ferroelectric constituting the first ferroelectric particles is preferably strontium titanate.

In terms of easy adjustment of the surface roughness Sa1 of the initial carrier in the specific range, the number average primary particle diameter of the first ferroelectric particles is preferably at least 15 nm and no greater than 85 nm, more preferably at least 20 nm and no greater than 80 nm, and further preferably at least 20 nm and no greater than 50 nm.

The first ferroelectric particles may be doped. When the first ferroelectric particles are doped, the amount of an element doped may be no greater than 1.00% by mass, no greater than 0.10% by mass, or less than 0.01% by mass relative to the total mass of the first ferroelectric particles. However, the first ferroelectric particles may not be doped. That is, the first ferroelectric particles may be constituted by a non-doped titanate compound. For example, the first ferroelectric particles may be constituted by a titanate compound to which lanthanum and Group 5 Elements (e.g., niobium or tantalum) of the Periodic Table are not doped. In order to reduce an energy barrier in charge supply to the toner particles from the carrier particles, the first ferroelectric particles of the first carrier particles preferably have either or both the same composition and the same number average primary particle diameter as later-described third ferroelectric particles of the toner particles.

(Different Carrier External Additive Particles)

Examples of the different carrier external additive particles include any known external additives.

<Carrier Mother Particles of First Carrier Particles>

In order to form images with less fogging, the ratio ("coat layer/core ratio) of the mass of the coat layers to the mass of the carrier cores is preferably at least 2.0% by mass and no greater than 4.0% by mass.

(Carrier Cores)

The carrier cores of the carrier mother particles contain a magnetic material, for example. Examples of the magnetic material contained in the carrier cores include metal oxides. More specific examples include magnetite, maghemite, and ferrite. Ferrite has high fluidity and tends to be chemically stable. Therefore, the carrier cores preferably contain ferrite in terms of forming high-quality images for a long period of term. Examples of the ferrite include barium ferrite, manganese ferrite (Mn-ferrite), Mn—Zn ferrite, Ni—Zn ferrite, Mn—Mg ferrite, Ca—Mg ferrite, Li ferrite, and Cu—Zn ferrite. The shape of the carrier cores is not particularly limited and can be irregular or spherical. Commercially available one may be used as the carrier cores. Furthermore, the carrier cores may be self-made by grinding and baking a magnetic material.

The carrier cores have a volume median diameter of preferably at least 20 μm and no greater than 65 μm, more preferably at least 20 μm and no greater than 50 μm, and further preferably at least 20 μm and less than 40 μm. As a result of the volume median diameter of the carrier cores being set to at least 20 μm, carrier development hardly occurs. Accordingly, the first carrier particles attached to the image bearing member can be inhibited from moving to the transfer belt from the image bearing member, thereby inhibiting occurrence of image defects such as a transfer defect. Also, occurrence of poor cleaning can be inhibited because carrier development hardly occurs. As a result of the volume median diameter of the carrier cores being set to no greater than 65 μm by contrast, the magnetic brush of the initial developer formed on the circumferential surface of the developer bearing member in image formation is thick, thereby achieving formation of high-quality images.

The carrier cores have a saturation magnetization of preferably at least 30 emu/g and no greater than 90 emu/g, and more preferably at least 65 emu/g and no greater than 90 emu/g. When the carrier cores contain Mn-ferrite, the saturation magnetization of the carrier cores tends to decrease as the percentage content of Mn is increased. Also, when the carrier cores contain Mn—Mg ferrite, the saturation magnetization of the carrier cores tends to decrease as the percentage content of Mg is increased.

(Coat Layers)

The coat layers of the carrier mother particles contain a coating resin, the second ferroelectric particles, and carbon black particles, for example.

The coating resin is described below. The coating resin preferably includes silicone resin. As a result of the coating resin including silicone resin, the toner can be frictionally charged in a favorable manner. Preferable examples of the silicone resin include a silicone resin with a methyl group and an epoxy resin-modified silicone resin. An example of the silicone resin with a methyl group is a silicone resin with a methyl group and with no phenyl group. Another example of the silicone resin with a methyl group is a silicone resin with a methyl group and a phenyl group (also referred to below as methylphenyl silicone resin). The coat layers may contain only the silicone resin as the coating resin or further contain a resin other than the silicone resin. The silicone resin has a percentage content of preferably at least 80% by mass relative to the mass of the coating resin, more preferably at least 90% by mass, and particularly preferably 100% by mass. The coating resin has been described so far.

The second ferroelectric particles are described next. Examples of the second ferroelectric particles include the same particles as those listed as the examples of the first ferroelectric particles. The ferroelectric constituting the second ferroelectric particles is preferably barium titanate.

In order to form images with less fogging and inhibit toner scattering, the second ferroelectric particles have a content ratio of preferably at least 2 parts by mass and no greater than 47 parts by mass to 100 parts by mass of the coating resin, more preferably at least 3 parts by mass and no greater than 45 parts by mass, and further preferably at least 10 parts by mass and no greater than 40 parts by mass. When the coating resin includes two or more resins, the mass of the coating resin means the total mass of the two or more resins.

The second ferroelectric particles preferably have a number average primary particle diameter of at least 100 nm and no greater than 500 nm. In order to reduce variation in the amount of charge of the toner upon variation in toner concentration in the initial developer, the second ferroelectric particles preferably have a number average primary particle diameter of at least 200 nm. In order to form images with less fogging, the second ferroelectric particles preferably have a number average primary particle diameter of no greater than 400 nm. The second ferroelectric particles have been described so far.

The carbon black particles are described next. The carbon black particles are conductive. As such, when the coat layers contain the carbon black particles, charge can smoothly move from the first carrier particles to the toner particles. As a result, the toner particles can be charged to a desired amount of charge, thereby achieving formation of images with less fogging.

The carbon black particles have a number average primary particle diameter of preferably at least 10 nm and no greater than 50 nm, and more preferably at least 30 nm and no greater than 40 nm. The carbon black particles have a dibutyl phthalate (DBP) oil absorption of preferably at least 300 $cm^3/100$ g and no greater than 700 $cm^3/100$ g, and more preferably at least 400 $cm^3/100$ g and no greater than 600 $cm^3/100$ g. The carbon black particles have a BET specific surface area of preferably at least 1000 $m^2/g$ and no greater than 2000 $m^2/g$, and more preferably at least 1200 $m^2/g$ and no greater than 1500 $m^2/g$. The amount of the carbon black particles is preferably at least 1 part by mass and no greater than 10 parts by mass relative to 100 parts by mass of the coating resin. The carbon black particles have been described so far.

Note that the first carrier particles may contain any known additives. The first carrier particles preferably have a volume median diameter of at least 25 μm and no greater than 100 μm. The initial carrier contained in the initial developer in the image forming apparatus according to the first embodiment and the initial carrier contained in the initial developer used in the image formation method according to the second embodiment have been described so far.

[Replenishment Carrier Contained in Replenishment Developer]

The following describes the replenishment carrier contained in the replenishment developer in the image forming apparatus according to the first embodiment and the replenishment carrier contained in the replenishment developer used in the image formation method according to the second embodiment further in detail. The replenishment carrier contains second carrier particles. Preferably, the second carrier particles each include a carrier mother particle and the first ferroelectric particles attached to the surface of the carrier mother particle.

Preferably, the content of the first ferroelectric particles relative to the mass of the carrier mother particles in the second carrier particles is smaller than the content of the first ferroelectric particle relative to the mass of the carrier mother particles in the first carrier particles. As a result of the content of the first ferroelectric particles relative to the mass of the carrier mother particles in the second carrier particles being small, the outermost surfaces of the second carrier particles of the replenishment carrier can be smoother than that of the first carrier particles of the initial carrier. As a result, the ratio Sa1/Sa2 can be easily adjusted within the specific range. Furthermore, with a small content of the first ferroelectric particles relative to the mass of the carrier mother particles in the second carrier particles, manufacturing cost of the replenishment carrier can be reduced.

In terms of easy adjustment of the ratio Sa1/Sa2 within the specific range, the content ratio of the ferroelectric particles in the second carrier particles is preferably no greater than 0.16 parts by mass to 100.00 parts by mass of the carrier mother particles, and more preferably at least 0.01 parts by mass and no greater than 0.16 parts by mass.

Figure 5:
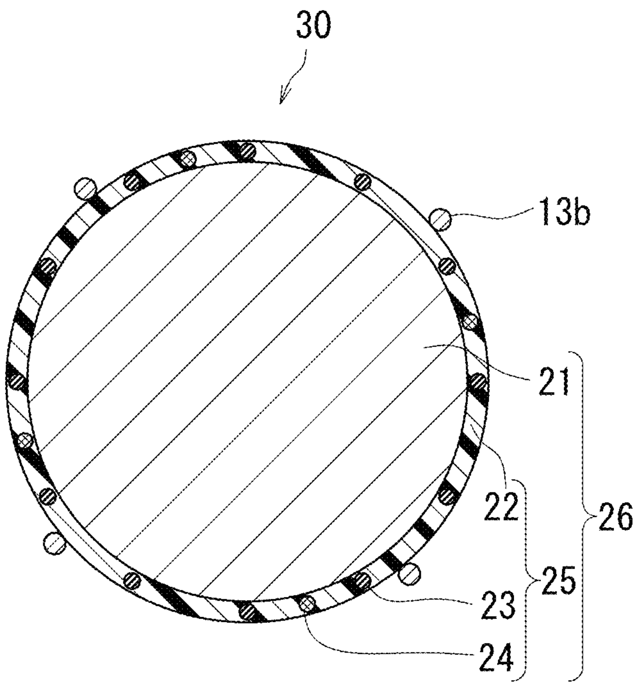
FIG. 5 is a cross-sectional view of an example of a second carrier particle contained in a replenishment carrier that is contained in a replenishment developer in the image forming apparatus according to the first embodiment of the present disclosure.

One example of the structure of the second carrier particles contained in the replenishment developer is described below with reference to FIG. 5. FIG. 5 is a cross-sectional view of an example of a second carrier particle 30 contained in the replenishment developer. Note that the same reference signs as those in FIG. 3 are assigned to the same elements of the second carrier particle 30 as those of the first carrier particle 20 described with reference to FIG. 3, and description thereof is not repeated.

The second carrier particle 30 illustrated in FIG. 5 includes a carrier mother particle 26 and the first ferroelectric particles 13*b*. The first ferroelectric particles 13*b* are attached to (provided on) the surface of the carrier mother particle 26. The first ferroelectric particles 13*b* are attached to the surface of the coat layer 25 rather than the inside of the coat layer 25. The first ferroelectric particles 13*b* are located on the outermost surface of the second carrier particle 30. The carrier mother particle 26 illustrated in FIG. 5 has the same configuration as that of the carrier mother particles 26 illustrated in FIG. 3. The content of the first ferroelectric particles 13*b* relative to the mass of the carrier mother particle 26 in the second carrier particle 30 illustrated in FIG. 5 is smaller than the content of the first ferroelectric particles 13*b* relative to the mass of the carrier mother particle 26 in the first carrier particle 20 illustrated in FIG. 3.

Figure 6:
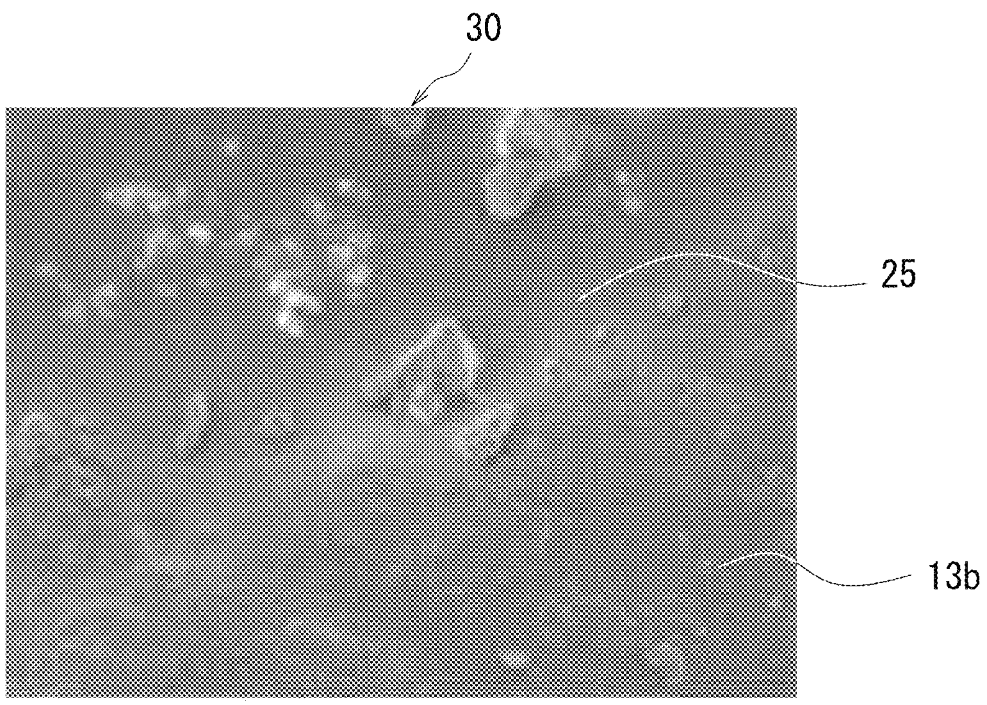
FIG. 6 is a microphotograph of the surface of the second carrier particle illustrated in FIG. 5.

Description of the example of the structure of the second carrier particles 30 contained in the replenishment developer is continued with further reference to FIG. 6. FIG. 6 is a microphotograph of the surface of the second carrier particle 30 illustrated in FIG. 5. The microphotograph of FIG. 6 is taken through observation of the surface of the second carrier particle 30 using a three-dimensional microscope ("OPTELICS HYBRID (mc2000)", product of Lasertec) at an observation magnification of 1800×. As shown in FIG. 6, the first ferroelectric particles 13*b* are attached to the surface of the coat layer 25 (corresponding to the surface of the carrier mother particle 26). The number of the first ferroelectric particles 13*b* on the second carrier particle 30 in FIG. 6 is smaller than the number of the first ferroelectric particles 13*b* on the first carrier particle 20 in FIG. 4. Therefore, the outermost surfaces of the second carrier particles 30 contained in the replenishment carrier is smoother than that of the first carrier particles 20 contained in the initial carrier.

An example of the structure of the second carrier particles contained in the replenishment developer has been described so far with reference to FIGS. 5 and 6. However, the structure of the second carrier particles contained in the replenishment developer is not limited particularly and may differ from that of the second carrier particle 30 illustrated in FIG. 5. For example, it is only required that the coat layer of the second carrier particle coats at least a part of the carrier core. That is, a part of the carrier core may be exposed. Furthermore, the coat layers of the second carrier particles may not contain either or both the second ferroelectric particles and the carbon black particles. Furthermore, the second carrier particles may not include the coat layers. Furthermore, it is possible that the second carrier particles do not include the first ferroelectric particles and the surface roughness Sa2 of the replenishment carrier is adjusted by another method. The replenishment carrier is described next further in detail.

<External Additive Particles of Second Carrier Particles>

Examples of external additive particles of the second carrier particles contained in the replenishment carrier include the first ferroelectric particles and the different carrier external additive particles. Examples of the first ferroelectric particles of the second carrier particles contained in the replenishment carrier include the same as those listed as the examples of the first ferroelectric particles of the first carrier particles contained in the initial carrier. Examples of the different carrier external additive particles of the second carrier particles contained in the replenishment carrier include the same as those listed as the examples of the different carrier external additive particles of the first carrier particles contained in the initial carrier.

<Carrier Mother Particles of Second Carrier Particles>

Examples of the carrier mother particles of the second carrier particles contained in the replenishment carrier include the same as those listed as the examples of the carrier mother particles of the first carrier particles contained in the initial carrier.

The replenishment carrier contained in the replenishment developer in the image forming apparatus according to the first embodiment and the replenishment carrier contained in the replenishment developer used in the image formation method according to the second embodiment have been described so far.

[Toner Contained in Initial Developer and Toner Contained in Replenishment Developer]

The toner contained in the initial developer and the replenishment developer in the image forming apparatus according to the first embodiment and the toner contained in the initial developer and the replenishment developer used in the image formation method according to the second embodiment are described further in detail. The toner contained in the initial developer and the toner contained in the replenishment developer each include toner particles. The toner particles each include external additive particles and a toner mother particle.

Figure 7:
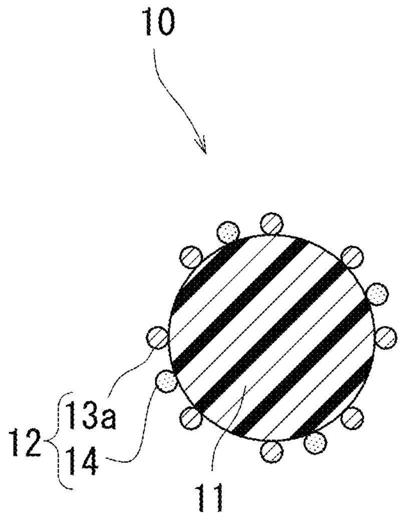
FIG. 7 is a cross-sectional view of an example of a toner particle contained in a toner that is contained in the initial developer and the replenishment developer in the image forming apparatus according to the first embodiment of the present disclosure.

One example of the structure of the toner particles is described below with reference to FIG. 7. FIG. 7 is a cross-sectional view of an example of a toner particle 10 contained in the toner. The toner particle 10 illustrated in FIG. 7 includes a toner mother particle 11 and external additive particles 12. The toner mother particle 11 is a non-capsule toner mother particle. The external additive particles 12 are attached to (provided on) the surface of the toner mother particle 11. The external additive particles 12 include ferroelectric particles 13*a*. In the following, the "ferroelectric particles 13*a* attached to the surface of the toner mother particle 11" may be also referred to below as "third ferroelectric particles 13*a*". The external additive particles 12 may further include external additive particles 14 (also referred to below as "additional toner external additive particles") other than the third ferroelectric particles 13*a* as necessary. One example of the structure of the toner particles has been described so far with reference to FIG. 7. However, the structure of the toner particles is not limited particularly and may differ from that of the toner particle 10 illustrated in FIG. 7. For example, the toner particles may not contain either or both the ferroelectric particles and the additional toner external additive particles. Furthermore, the toner mother particles may be capsule toner mother particles each including a toner core and a shell layer covering the toner core. The replenishment carrier is described next further in detail.

<External Additive Particles of Toner Particles>

Examples of the external additive particles of the toner particles include the third ferroelectric particles and the additional toner external additive particles.

(Third Ferroelectric Particles)

Examples of the third ferroelectric particles of the toner particles include the same as those listed as the examples of the first ferroelectric particles of the first carrier particles contained in the initial carrier. The third ferroelectric particles are preferably strontium titanate particles.

In order to form images with less fogging and inhibit toner scattering, the third ferroelectric particles have a content ratio of at least 0.3 parts by mass and no greater than 0.9 parts by mass to 100.0 parts by mass of the toner mother particles, more preferably at least 0.3 parts by mass and no greater than 0.8 parts by mass, and further preferably at least 0.3 parts by mass and no greater than 0.5 parts by mass.

(Additional Toner External Additive Particles)

Examples of the additional toner external additive particles include silica particles, resin particles, alumina particles, magnesium oxide particles, and zinc oxide particles. Preferable examples of the additional toner external additive particles include silica particles and resin particles.

The silica particles may be surface treated. For example, either or both hydrophobicity and positive chargeability may be imparted to the surfaces of the silica particles by a surface treatment agent. The silica particles preferably have a number average primary particle diameter of at least 1 nm and no greater than 60 nm.

In order to favorably fix the toner particles to a recording medium, the resin particles are preferably thermoplastic resin particles, and more preferably styrene-acrylic resin particles. The styrene-acrylic resin is a copolymer of at least one styrene-based monomer and at least one acrylic acid-based monomer. The styrene-acrylic resin is preferably a copolymer of styrene, (meth)acrylic acid alkyl ester, and divinylbenzene, and more preferably a copolymer of styrene, butyl (meth)acrylate, and divinylbenzene.

Preferably, the percentage content of a repeating unit derived from styrene, the percentage content of a repeating unit derived from (meth)acrylic acid alkyl ester, and the percentage content of a repeating unit derived from divinylbenzene to all repeating units included in the styrene-acrylic resin are respectively at least 1% by mol and no greater than 30% by mol, at least 30% by mol and no greater than 50%, and at least 30% by mol and no greater than 50% by mol. As a result of the resin particles serving as spacer particles, the third ferroelectric particles are inhibited from being buried in the toner mother particles. Therefore, the resin particles preferably have a number average primary particle diameter greater than the third ferroelectric particles. The resin particles preferably have a number average primary particle diameter of at least 30 nm and no greater than 120 nm.

The amount of the additional toner external additive particles is preferably at least 0.1 parts by mass and no greater than 10.0 parts by mass relative to 100.0 parts by mass of the toner mother particles.

<Toner Mother Particles>

The toner mother particles contain a binder resin, for example. The toner mother particles may further contain at least one selected from the group consisting of a colorant, a charge control agent, and a releasing agent. The binder resin, the colorant, the charge control agent, and the releasing agent are described below.

(Binder Resin)

In order that the toner has excellent low-temperature fixability, the toner mother particles preferably contain a thermoplastic resin as the binder resin, and more preferably contain a thermoplastic resin at a percentage content of at least 85% by mass to the total mass of the binder resin. Examples of the thermoplastic resin include polyester resin, styrene-based resin, acrylic acid-based resin, acrylic acid ester-based resins (specific examples include acrylic acid ester polymers and methacrylic acid ester polymers), olefin-based resins (specific examples include polyethylene resin and polypropylene resin), vinyl resins (specific examples include vinyl chloride resin, polyvinyl alcohol, vinyl ether resin, and N-vinyl resin), polyamide resin, and urethane resin. Any copolymer of these resins, that is, a copolymer (specific examples include styrene-acrylic resin and styrene butadiene resin) in which any repeating unit has been introduced into any of the above resins can be used as the binder resin.

The binder resin is preferably polyester resin. The polyester resin is a polymer of one or more polyhydric alcohol monomers and one or more polybasic carboxylic acid monomers. Note that a polybasic carboxylic acid derivative (specific examples include an anhydride of polybasic carboxylic acid and a halide of polybasic carboxylic acid) may be used instead of the polybasic carboxylic acid monomer.

The polyester resin is preferably a polymer of a bisphenol monomer, a dibasic carboxylic acid monomer, and a tribasic carboxylic acid monomer. More preferably, the polyester resin is a polymer of a bisphenol A alkylene oxide adduct, dicarboxylic acid with a carbon number of at least 3 and no greater than 6, and aryl tricarboxylic acid. Further preferably, the polyester resin is a polymer of a bisphenol A ethylene oxide adduct, a bisphenol A propylene oxide adduct, fumaric acid, and trimellitic acid.

The polyester resin is preferably non-crystalline polyester resin. As to the non-crystalline polyester resin, it is often not possible to determine a definite melting point. Therefore, polyester resin of which endothermic peak cannot be definitely identified on an endothermic curve plotted using a differential scanning calorimeter can be determined to be a non-crystalline polyester resin.

The polyester resin has a softening point of preferably at least 50° C. and no greater than 200° C., and more preferably at least 80° C. and no greater than 120° C. The polyester resin has a glass transition point of preferably at least 40° C. and no greater than 100° C., and more preferably at least 40° C. and no greater than 60° C.

The polyester resin has a mass average molecular weight of preferably at least 10,000 and no greater than 50,000, and more preferably at least 20,000 and no greater than 40,000.

The polyester resin has an acid value of preferably at least 1 mgKOH/g and no greater than 30 mgKOH/g, and more preferably at least 10 mgKOH/g and no greater than 20 mgKOH/g. The polyester resin has a hydroxyl value of preferably at least 1 mgKOH/g and no greater than 50 mgKOH/g, and more preferably at least 20 mgKOH/g and no greater than 40 mgKOH/g.

(Colorant)

Any known pigment or dye can be used as the colorant according to the color of the toner. Examples of the colorant include a black colorant, a yellow colorant, a magenta colorant, and a cyan colorant.

Examples of the black colorant include carbon black. Alternatively, the black colorant may be a colorant of which color is adjusted to a black color using a yellow colorant, a magenta colorant, and a cyan colorant.

One or more compounds selected from the group consisting of a condensed azo compound, an isoindolinone compound, an anthraquinone compound, an azo metal complex, a methine compound, and an aryl amide compound may be used as the yellow colorant. Examples of the yellow colorant include C.I. Pigment Yellow (3, 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, or 194), Naphthol Yellow S, Hansa Yellow G, and C.I. Vat Yellow.

One or more compounds selected from the group consisting of a condensed azo compound, a diketopyrrolopyrrole compound, an anthraquinone compound, a quinacridone compound, a basic dye lake compound, a naphthol compound, a benzimidazolone compound, a thioindigo compound, and a perylene compound may be used as the magenta colorant. Examples of the magenta colorant include C.I. Pigment Red (2, 3, 5, 6, 7, 19, 23, 48:2, 48:3, 48:4, 57:1, 81:1, 122, 144, 146, 150, 166, 169, 177, 184, 185, 202, 206, 220, 221 or 254).

One or more compounds selected from the group consisting of a copper phthalocyanine compound, an anthraquinone compound, and a basic dye lake compound may be used as the cyan colorant. Examples of the cyan colorant include C.I. Pigment Blue (1, 7, 15, 15:1, 15:2, 15:3, 15:4, 60, 62, or 66), Phthalocyanine Blue, C.I. Vat Blue, and C.I. Acid Blue.

The amount of the colorant is preferably at least 1 part by mass and no greater than 20 parts by mass relative to 100 parts by mass of the binder resin.

(Charge Control Agent)

The charge control agent is used for the purpose of obtaining a toner excellent in charge stability and charge rise characteristics, for example. The charge rise characteristic of the toner serves as an indicator as to whether the toner can be charged to a specific charge level in a short period of time. Examples of the charge control agent include a positive charge control agent and a negative charge control agent. Cationic strength (positive chargeability) of the toner can be increased through the toner mother particles containing a positive charge control agent, and anionic strength (negative chargeability) of the toner can be increased through the toner mother particles containing a negative charge control agent. Examples of the positive charge control agent include pyridine, nigrosine, and quaternary ammonium salt. Examples of the negative charge control agent include metal-containing azo dye, sulfo group-containing resin, oil-soluble dye, metal salts of naphthenic acid, metal acetylacetonate complexes, salicylic acid-based metal complexes, boron compounds, fatty acid soap, and long-chain alkyl carboxylic acid salts. However, the charge control agent need not be contained in the toner mother particles when sufficient chargeability of the toner can be ensured. The amount of the charge control agent is preferably at least 0.1 parts by mass and no greater than 10.0 parts by mass relative to 100 parts by mass of the binder resin.

(Releasing Agent)

The releasing agent is used for the purpose of producing a toner excellent in hot offset resistance, for example. Examples of the releasing agent include aliphatic hydrocarbon-based waxes, oxides of aliphatic hydrocarbon-based waxes, plant-derived waxes, animal-derived waxes, mineral-derived waxes, ester waxes of which main component is fatty acid ester, and waxes in which a part or all of a fatty acid ester has been deoxidized. Examples of the aliphatic hydrocarbon-based waxes include polyethylene waxes (e.g., low molecular weight polyethylene), polypropylene waxes (e.g., low molecular weight polypropylene), polyolefin copolymers, polyolefin wax, microcrystalline wax, paraffin wax, and Fischer-Tropsch wax. Examples of the oxides of aliphatic hydrocarbon-based waxes include oxidized polyethylene wax and block copolymers of oxidized polyethylene wax. Examples of the plant-derived waxes include candelilla wax, caranuba wax, Japan wax, jojoba wax, and rice wax. Examples of the animal-derived waxes include beeswax, lanolin, and spermaceti. Examples of the mineral-derived waxes include ozokerite, ceresin, and petrolatum. Examples of the ester waxes of which main component is fatty acid ester include montanic acid ester wax and castor wax. Examples of the waxes in which a part or all of a fatty acid ester has been deoxidized include deoxidized caranuba wax. The amount of the releasing agent is preferably at least 1 part by mass and no greater than 20 parts by mass relative to 100 parts by mass of the binder resin.

Note that the toner particles may contain any known additive as necessary. The toner particles preferably have a volume median diameter of at least 4 μm and no greater than 12 μm. The toner mother particles have a volume median diameter of preferably at least 4 μm and no greater than 12 μm, and more preferably at least 5 μm and no greater than 9 μm. The toner contained in the initial developer and the toner contained in the replenishment developer may have the same configuration or may different configurations. The toner has a percentage content in the initial developer of preferably at least 1% by mass and no greater than 15% by mass, and more preferably at least 3% by mass and no greater than 10% by mass. The toner has a percentage content in the replenishment developer of preferably at least 50% by mass and no greater than 99% by mass, and more preferably at least 80% by mass and no greater than 95% by mass. The toner contained in the initial developer and the replenishment developer in the image forming apparatus according to the first embodiment and the toner contained in the initial developer and the replenishment developer used in the image formation method according to the second embodiment have been described so far.

EXAMPLES

The following provides further specific description of the present disclosure through use of Examples. However, the present disclosure is not limited to the scope of Examples.

[Toner Preparation]

<Toner Mother Particle Preparation>

Using an FM mixer ("FM-10B", product of Nippon Coke & Engineering Co., Ltd.), 100 parts by mass of a binder resin, 4 parts by mass of a colorant, 1 part by mass of a charge control agent, and 5 parts by mass of a releasing agent were mixed to yield a mixture. The binder resin used was a non-crystalline polyester resin (R1) having the following composition and properties. The colorant used was a copper phthalocyanine blue pigment (C.I. Pigment Blue 15:3). The charge control agent used was a quaternary ammonium salt ("BONTRON (registered Japanese trademark) P-51", product of ORIENT CHEMICAL INDUSTRIES CO., LTD.). The releasing agent used was a caranuba wax ("SPECIAL CARNAUBA WAX No. 1", product of S. Kato & Co.). The resultant mixture was melt-kneaded using a twin screw extruder ("PCM-30", product of Ikegai Corp.) to obtain a melt-kneaded product. The resultant melt-kneaded product was pulverized using a mechanical pulverizer ("TURBO MILL", product of FREUND-TURBO CORPORATION) to obtain a pulverized product. The resultant pulverized product was classified using a classifier ("ELBOW JET", product of Nittetsu Mining Co., Ltd.). Through the above, toner mother particles in powder form with a volume median diameter of 6.8 μm were obtained.

(Composition and Properties of Non-crystalline Polyester Resin (R1))

Monomer composition: bisphenol A propylene oxide adduct/bisphenol A ethylene oxide adduct/fumaric acid/trimellitic acid anhydride=1575 parts by mass/163 parts by mass/377 parts by mass/336 parts by mass Softening point (Tm): 100° C.

Glass transition point (Tg): 50° C.

Mass average molecular weight (Mw): 30,000

Acid value: 15 mgKOH/g

Hydroxyl value: 30 mgKOH/g

<External Additive Addition to Toner Mother Particles>

Using an FM mixer ("FM-10B", product of Nippon Coke & Engineering Co., Ltd.), 100.0 of the toner mother particles obtained as above, 1.5 parts by mass of silica particles, 0.5 parts by mass of third ferroelectric particles, and 0.9 parts by mass of resin particles were mixed at 4,000 rpm for 5 minutes to obtain a mixture. The silica particles used was "AEROSIL (registered Japanese trademark) REA90" produced by NIPPON AEROSIL CO., LTD. (dry silica particles to which positive chargeability has been imparted through surface treatment, number average primary particle diameter 20 rnm). The third ferroelectric particles used were non-doped strontium titanate particles (grain size-adjusted product of "SW-100" produced by Titan Kogyo, Ltd.) adjusted to have a number average primary particle diameter of 30 nm. The resin particles used were styrene-acrylic resin particles with a number average primary particle diameter of 40 m. The styrene-acrylic resin constituting the resin particles was a copolymer of 20% by mol of styrene, 40% by mol of butyl methacrylate, and 40% by mol of divinylbenzene. The resultant mixture was sifted using a 200-mesh sieve (opening 75 μm) to obtain a toner. The resultant toner was a positively chargeable toner.

[Carrier Preparation]

<Preparation of Carrier with Surface Roughness Sa of 0.30 μm>

(Preparation of Coating Liquid (L1))

A coating liquid (L1) was prepared for use of formation of coat layers of a carrier. A stainless vessel was charged with 300 g of a silicone resin solution (solid content: 150 g), 60 g of second ferroelectric particles, 9 g of a carbon black, and 435 g of toluene. The vessel contents were mixed using a homogenizer to obtain a coating liquid (L1). The silicone resin solution used was "KR-255" (solid content: methylphenyl silicone resin, solid concentration: 50% by mass) produced by Shin-Etsu Chemical Co., Ltd. The second ferroelectric particles used were barium titanate particles (number average primary particle diameter: 300 nm) produced by KCM Corporation. The carbon black used was "KETJEN BLACK EC600JD" (DBP oil absorption: 495 $cm^3$/100 g, BET specific surface area: 1270 $m^2$/g, number average primary particle diameter: 34.0 nm) being a conductive carbon black produced by Lion Specialty Chemicals Co., Ltd.

(Carrier Mother Particle Preparation)

The coating liquid (L1) was sprayed toward 5000 g of carrier cores while the carrier cores are allowed to flow using a fluidized bed coating apparatus ("FD-MP-01 Type D", product of Powrex Corporation). The carrier cores used were manganese ferrite cores (product of DOWA IP CREATION CO., LTD., volume median diameter: 35 μm, saturation magnetization: 70 emu/g). Coating was carried out under conditions of a temperature of fed air of 80° C., a fed flow rate of 0.3 $m^3$/min, and a rotor rotational speed of 400 rpm. The amount of the coating liquid (L1) charged to the fluidized bed coating apparatus was adjusted so that the coating resin was 1.50 g and the second ferroelectric (barium titanate) particles was 0.60 g relative to 100.00 g of the carrier cores. That is, the content ratio of the coating resin and the content ratio of the second ferroelectric particles to 100.00 parts by mass of the carrier cores were 1.50 parts by mass and 0.60 parts by mass, respectively. Carrier cores coated with the coating liquid (L1) were obtained through the spraying. Next, the carrier cores coated with the coating liquid (L1) were heated at 250° C. for 2 hours using an oven to form coat layers on the surfaces of the carrier cores. Through the above, carrier mother particles were obtained.

(External Additive Addition to Carrier Mother Particles)

First ferroelectric particles were attached to the surfaces of the carrier mother particles obtained as above by mixing 100.00 parts by mass of the carrier mother particles and 0.020 parts by mass of the first ferroelectric particles using a ROCKING MIXER (registered Japanese trademark)

("RM-10", product of AICHI ELECTRIC CO., LTD.) for 30 minutes. Through the above, a carrier containing carrier particles was obtained. The resultant carrier had a surface roughness Sa of 0.30 μm. The first ferroelectric particles used were non-doped strontium titanate particles (grain size-adjusted product of "SW-100" produced by Titan Kogyo, Ltd.) adjusted to have a number average primary particle diameter of 30 nm.

<Preparation of Carrier with Surface Roughness Sa Not Being 0.30 μm>

Carriers with a surface roughness Sa not being 0.30 μm were prepared according to the same method as the method described above in "Preparation of Carrier with Surface Roughness Sa of 0.30 μm" in all aspects other than the following changes. In order to mainly adjust the surface roughness Sa, the content of the first ferroelectric particles relative to 100.00 parts by mass of the carrier mother particles in "External Additive Addition to Carrier Mother Particles" described above was changed. Furthermore, the amount of the second ferroelectric particles added relative to 150 g of the solid content of the silicone resin solution was changed in "Preparation of Coating Liquid (L1)" described above in order to finely adjust the surface roughness Sa. As a result, the content of the second ferroelectric particles relative to 100.00 parts by mass of the carrier cores in "Carrier Mother Particle Preparation" described above was changed. For example, the content of the second ferroelectric particles added relative to 150 g of the solid content of the silicon resin solution was changed from 60 g to 15 g to change the content of the second ferroelectric particles relative to 100.00 parts by mass of the carrier cores from 0.15 parts by mass to 0.60 parts by mass.

In "External Additive Addition to Carrier Mother Particles" described above, the surface roughness Sa of the carrier increases (i.e., the surface of the carrier is rough) as the content of the first ferroelectric particles relative to 100 parts by mass of the carrier mother particles is increased. As a result, the surface roughness Sa can be mainly adjusted. In "Carrier Mother Particle Preparation" described above, the surface roughness Sa of the carrier decreases (i.e., the surface of the carrier is smooth) as the content of the second ferroelectric particles relative to 100.00 parts by mass of the carrier cores is increased. As a result, the surface roughness Sa can be finely adjusted. Preparation Examples (C-1) to (C-11) are shown below in Table 1. The Preparation Examples are typical examples showing the relationship among the content of the first ferroelectric particles relative to 100.00 parts by mass of the carrier mother particles, the content of the second ferroelectric particles relative to 100.00 parts by mass of the carrier cores, and the surface roughness Sa of the resultant carrier. By referencing Table 1, the content of the first ferroelectric particles relative to 100.00 parts by mass of the carrier mother particles and the content of the second ferroelectric particles relative to 100.00 parts by mass of the carrier cores were changed as appropriate to obtain carriers each with desired surface roughness Sa (more specifically, an initial carrier with a desired surface roughness Sa1 and a replenishment carrier with a desired surface roughness surface roughness Sa2) to be used in Studies 1 to 4 described later.

TABLE 1

| Preparation Example | Coat layer Second ferroelectric particle amount (part by mass) | External additive addition First ferroelectric particle amount (part by mass) | Surface roughness Sa (μm) |
|---|---|---|---|
| C-1 | 0.60 | 0.010 | 0.24 |
| C-2 | 0.60 | 0.020 | 0.30 |
| C-3 | 0.60 | 0.023 | 0.32 |
| C-4 | 0.60 | 0.040 | 0.47 |
| C-5 | 0.15 | 0.040 | 0.53 |
| C-6 | 0.15 | 0.096 | 0.68 |
| C-7 | 0.15 | 0.129 | 0.77 |
| C-8 | 0.15 | 0.151 | 0.83 |
| C-9 | 0.15 | 0.181 | 0.91 |
| C-10 | 0.15 | 0.214 | 1.00 |
| C-11 | 0.15 | 0.240 | 1.07 |

The terms in Table 1 mean as follows.

First ferroelectric particle amount: content ratio (unit: part by mass) of first ferroelectric particles to 100.00 parts by mass of carrier mother particles Second ferroelectric particle amount: content ratio (unit: part by mass) of second ferroelectric particles to 100.00 parts by mass of carrier cores Surface roughness: arithmetic mean surface roughness (unit: μm) of carrier

[Measurement Method]

<Arithmetic Mean Surface Roughness of Carrier>

The arithmetic mean surface roughness Sa (also referred to below as surface roughness Sa) of each carrier was measured by a method in compliance with ISO 25178.

<Apparent Density of Developer>

The apparent density of each developer was measured by a method in compliance with the Japanese Industrial Standards (JIS) Z2504 (Metallic Powders-Determination of apparent density).

<Surface Roughness of Image Bearing Member>

The surface roughness Ra of an image bearing member was measured by a method in compliance with the Japanese Industrial Standards (JIS) B0601 (Geometrical Product Specifications (GPS)-Surface texture: Profile method-Terms, Definitions and Surface Texture Parameters).

<Number Average Primary Particle Diameter>

The number average primary particle diameters of the first ferroelectric particles, the second ferroelectric particles, the third ferroelectric particles, and the resin particles each were measured using a scanning electron microscope ("JSM-7600F", product of JEOL Ltd., field emission scanning electron microscope). In measurement of each number average primary particle diameter, equivalent circle diameters (Heywood diameters: diameters of circles having the same areas as projected areas of the primary particles) of 100 primary particles were measured and an arithmetic mean value thereof was obtained.

[Method for Preparing Developers Used for Evaluation]

As developers used for later-descried evaluations, initial developers and replenishment developers were prepared by the method described below.

<Initial Developer Preparation Method>

Using a shaker mixer (TURBULA (registered Japanese trademark) MIXER T2F", product of Willy A. Bachofen AG (WAB)), 92 parts by mass of any of the carriers and 8 parts by mass of the toner were mixed for 30 minutes. Through the above, initial developers were obtained. The initial developers had a toner concentration of 8% by mass.

<Replenishment Developer Preparation Method>

Using a shaker mixer (TURBULA (registered Japanese trademark) MIXER T2F", product of Willy A. Bachofen AG (WAB)), 10 parts by mass of any of the carriers and 90 parts by mass of the toner were mixed for 30 minutes. Through the above, replenishment developers were obtained. The replenishment developers had a toner concentration of 90% by mass.

[Evaluation Methods]

Carrier development, trailing edge image roughness, image pitch unevenness, and image grain fineness were evaluated for image forming apparatuses each including one of the initial developers and one of the replenishment developers. The evaluation apparatuses used for evaluation and the evaluation methods were as follows.

<Evaluation Apparatus>

Each of the evaluation apparatuses used for evaluation was an image forming apparatus including an amorphous silicon photosensitive drum being an image bearing member and a development device using a two-component developer. The development device had a configuration described with reference to FIG. 2. The DC component of the developing bias to be applied to the developer bearing member was set to 150 V, and the peak-to-peak value of the AC component was set to 1100 V f 100 V. The initial developer was charged to the accommodation section of the development device. The replenishment developer was charged to the replenishment section of the development device.

<Evaluation Method of Carrier Development>

Evaluation of carrier development was carried out in an environment at a temperature of 25° C. and a relative humidity of 50%. An electrostatic latent image based on data of an image a (lattice image) was formed on the image bearing member of the evaluation apparatus, and developed into a toner image. Adhesive tape was attached to the toner image on the image bearing member, and peeled off. The toner image attached to the peeled adhesive tape was observed using a microscope and the number of carrier particles included in the toner image was counted. The number of the carrier particles counted was divided by an area (observed area) of the observed toner image to obtain the number of carrier particles per 0.2 $cm^2$ of the observed area. Carrier development was evaluated according to the following criteria.

(Criteria of Carrier Development)

A (good): number of carrier particles of less than 0.85 pcs/0.2 $cm^2$

B (poor): number of carrier particles of at least 0.85 pcs/0.2 $cm^2$

<Evaluation Method of Trailing Edge Image Roughness>

Evaluation of trailing edge image roughness was carried out in an environment at a temperature of 25° C. and a relative humidity of 50%. Using the evaluation apparatus, an image b (halftone image) was printed on a sheet of paper. The printed image b was taken to be an initial image. Next, an image c (image with a printing rate of 5%) was consecutively printed on 100,000 sheets of paper using the evaluation apparatus. Next, the image b was re-printed on one sheet of paper and the printed image b was taken to be a post-printing image. The initial image and the post-printing image were visually observed to check the presence or absence of trailing edge image roughness. Thereafter, trailing edge image roughness was evaluated according to the following criteria.

(Criteria of Trailing Edge Image Roughness)

A (good): Trailing edge image roughness in the post-printing image is comparable to trailing edge image roughness in the initial image.

B (poor): Trailing edge image roughness in the post-printing image is worse than trailing edge image roughness in the initial image.

<Evaluation Method of Image Pitch Unevenness and Image Grain fineness>

Evaluation of image pitch unevenness and image grain fineness was carried out in an environment at a temperature of 25° C. and a relative humidity of 50%. Using the evaluation apparatus, an image d (halftone image with a printing rate of 10%) was consecutively printed on 10,000 sheets of paper. Each image d printed on the 10,000 sheets of the paper was visually observed to check grain fineness and presence or absence of pitch unevenness. Image pitch unevenness and image grain fineness were evaluated according to the following criteria.

(Criteria of Image Pitch Unevenness) A (good): Pitch unevenness was not observed over entire period of 10,000-sheet printing.

B (poor): Pitch unevenness was observed at least part of 10,000-sheet printing.

(Criteria of Image Grain fineness) A (good): Fine-grained images were printed over entire period of 10,000-sheet printing.

B (poor): Coarse-grained images were printed in at least part of 10,000-sheet printing.

Next, Studies 1 to 4 described below were carried out. In Studies 1 to 4, whether the surface roughness Sa1 of the initial carrier was at least 0.3 μm and no greater than 1.0 μm and whether the ratio Sa1/Sa2 was at least 1.2 and no greater than 3.4 were determined according to values rounded to the second decimal place of the measurement values.

[Study 1: Surface Roughness Sa1 of Initial Carrier]

First, the surface roughness Sa1 of the initial carrier was studied.

Initial developers to be used in Study 1 were prepared. In detail, the initial developers to be used in Study 1 were prepared according to the method described above in "Initial Developer Preparation Method" using the toner obtained in "Toner Preparation" described above and the carriers obtained in "Carrier Preparation" described above. In the preparation of the initial developers to be used in Study 1, carriers with the surface roughness Sa1 shown in Table 2 were used among the carriers obtained in "Carrier Preparation" described above.

Replenishment developers to be used in Study 1 were prepared. In detail, the replenishment developers to be used in Study 1 were prepared according to the method described above in "Replenishment Developer Preparation Method" using the toner obtained in "Toner Preparation" described above and the carriers obtained in "Carrier Preparation" described above. In the preparation of the replenishment developers to be used in Study 1, carriers with the surface roughness Sa1 shown in Table 2 and a surface roughness Sa2 obtained from the ratio Sa1/Sa2 being 1.75 were used among the carriers obtained in "Carrier Preparation" described above.

Carrier development, trailing edge image roughness, image pitch unevenness, and image grain fineness were evaluated for image forming apparatuses each including one of the initial developers and one of the replenishment developers according to the method described above in "Evaluation Methods". Results of evaluation of carrier development are shown in Table 2. As to the results of evaluation of trailing edge image roughness, the results of evaluation of image pitch unevenness, and the results of evaluation of image grain fineness, all of Examples and Comparative Examples shown in Table 2 were rated as A (good).

TABLE 2

| | CE 1-1 | E 1-1 | E 1-2 | E 1-3 | E 1-4 | E 1-5 | E 1-6 | E 1-7 | CE 1-2 |
|---|---|---|---|---|---|---|---|---|---|
| Sa1 (μm) | 0.24 | 0.30 | 0.47 | 0.53 | 0.68 | 0.77 | 0.91 | 1.00 | 1.07 |
| Carrier development | B | A | A | A | A | A | A | A | B |

The terms in Table 2 mean as follows.

CE: Comparative Example

E: Example

Sa1: surface roughness Sa1 (unit: μm) of initial carrier

In each of Examples and each of Comparative Examples shown in Table 2, the ratio Sa1/Sa2, the packing volume Vp, the gap width DS, and the surface roughness Ra of the image bearing member were as follows.

Ratio Sa1/Sa2:1.75

Packing volume Vp: 62.5%

Gap width DS: 0.033 cm

Surface roughness Ra of image bearing member: 45 nm

As shown in Table 2, the surface roughness Sa1 of the initial carrier in the image forming apparatus of Comparative Example 1-1 was less than 0.3 μm. The image forming apparatus of Comparative Example 1-1 was rated as poor in carrier development.

As shown in Table 2, the surface roughness Sa1 of the initial carrier in the image forming apparatus of Comparative Example 1-2 was greater than 1.0 μm. The image forming apparatus of Comparative Example 1-2 was rated as poor in carrier development.

By contrast, the surface roughness Sa1 of the initial carrier in each of the image forming apparatuses of Examples 1-1 to 1-7 was at least 0.3 μm and no greater than 1.0 μm. As to the results of evaluation of carrier development, the results of evaluation of trailing edge image roughness, the results of evaluation of image pitch unevenness, and the results of evaluation of image grain fineness, all of the image forming apparatuses of Examples 1-1 to 1-7 were rated as good.

[Study 2: Upper Limit of Ratio Sa1/Sa2]

The upper limit of the ratio Sa1/Sa2 was studied next.

Initial developers to be used in Study 2 were prepared. In detail, the initial developers to be used in Study 2 were prepared according to the method described above in “Initial Developer Preparation Method” using the toner obtained in “Toner Preparation” described above and the carriers obtained in “Carrier Preparation” described above. In the preparation of the initial developers to be used in Study 2, carriers with the surface roughness Sa1 shown in Table 3 were used among the carriers obtained in “Carrier Preparation” described above.

Replenishment developers to be used in Study 2 were prepared. In detail, the replenishment developers to be used in Study 2 were prepared according to the method described above in “Replenishment Developer Preparation Method” using the toner obtained in “Toner Preparation” described above and the carriers obtained in “Carrier Preparation” described above. In the preparation of the replenishment developers to be used in Study 2, carriers with the surface roughness Sa2 shown in Table 3 were used among the carriers obtained in “Carrier Preparation” described above.

Carrier development, trailing edge image roughness, image pitch unevenness, and image grain fineness were evaluated for image forming apparatuses each including one of the initial developers and one of the replenishment developers according to the method described above in “Evaluation Methods”. Results of evaluation of carrier development are shown in Table 3. As to the results of evaluation of trailing edge image roughness, the results of evaluation of image pitch unevenness, and the results of evaluation of image grain fineness, all of Examples and Comparative Examples shown in Table 3 were rated as A (good).

TABLE 3

| | Sa1 (μm) | Sa2 (μm) | Sa1/Sa2 | Carrier development |
|---|---|---|---|---|
| Comparative Example 2-1 | 1.07 | 0.30 | 3.57 | B |
| Example 2-1 | 0.91 | 0.32 | 2.84 | A |
| Example 2-2 | 0.91 | 0.52 | 1.75 | A |

The terms in Table 3 mean as follows.

Sa1: surface roughness Sa1 (unit: μm) of initial carrier

Sa2: surface roughness Sa2 (unit: μm) of replenishment carrier

Sa1/Sa2: ratio Sa1/Sa2

In each of Examples and each of Comparative Examples shown in Table 3, the packing volume Vp, the gap width DS, and the surface roughness Ra of the image bearing member were as follows.

Packing volume Vp: 62.5%

Gap width DS: 0.033 cm

Surface roughness Ra of image bearing member: 45 nm

As shown in Table 3, the initial carrier had a surface roughness Sa1 of greater than 1.0 μm and a ratio Sa1/Sa2 was greater than 3.4 in the image forming apparatus of Comparative Example 2-1. The image forming apparatus of Comparative Example 2-1 was rated as poor in carrier development.

By contrast, the initial carriers had a surface roughness Sa1 of at least 0.3 μm and no greater than 1.0 μm and the ratio Sa1/Sa2 was at least 1.2 and no greater than 3.4 in each of the image forming apparatuses of Examples 2-1 and 2-2. As to the results of evaluation of carrier development, the results of evaluation of trailing edge image roughness, the results of evaluation of image pitch unevenness, and the results of evaluation of image grain fineness, all of Examples 2-1 and 2-2 were rated as good.

[Study 3: Lower Limit of Ratio Sa1/Sa2]

The lower limit of the ratio Sa1/Sa2 was studied next.

Initial developers to be used in Study 3 were prepared. In detail, the initial developers to be used in Study 3 were prepared according to the method described above in “Initial Developer Preparation Method” using the toner obtained in “Toner Preparation” described above and the carriers obtained in “Carrier Preparation” described above. In the preparation of the initial developers to be used in Study 3, carriers with the surface roughness Sa1 shown in Table 4 were used among the carriers obtained in "Carrier Preparation" described above.

Replenishment developers to be used in Study 3 were prepared. In detail, the replenishment developers to be used in Study 3 were prepared according to the method described above in "Replenishment Developer Preparation Method" using the toner obtained in "Toner Preparation" described above and the carriers obtained in "Carrier Preparation" described above. In the preparation of the replenishment developers to be used in Study 3, carriers with the surface roughness Sa2 shown in Table 4 were used among the carriers obtained in "Carrier Preparation" described above.

Carrier development, trailing edge image roughness, image pitch unevenness, and image grain fineness were evaluated for image forming apparatuses each including one of the initial developers and one of the replenishment developers according to the method described above in "Evaluation Methods". Results of evaluation of trailing edge image roughness are shown in Table 4. As to the results of evaluation of carrier development, the results of evaluation of image pitch unevenness, and the results of evaluation of image grain fineness, all of Examples and Comparative Examples shown in Table 4 were rated as A (good).

TABLE 4

| | Sa1 | Sa2 | Sa1/Sa2 | Trailing edge image roughness |
|---|---|---|---|---|
| Comparative Example 3-1 | 0.33 | 0.32 | 1.03 | B |
| Comparative Example 3-2 | 0.33 | 0.52 | 0.64 | B |
| Comparative Example 3-3 | 0.33 | 0.83 | 0.40 | B |
| Comparative Example 3-4 | 0.33 | 1.05 | 0.31 | B |
| Example 3-1 | 0.55 | 0.32 | 1.72 | A |
| Comparative Example 3-5 | 0.55 | 0.52 | 1.06 | B |
| Comparative Example 3-6 | 0.55 | 0.83 | 0.66 | B |
| Comparative Example 3-7 | 0.55 | 1.05 | 0.52 | B |
| Example 3-2 | 0.82 | 0.32 | 2.56 | A |
| Example 3-3 | 0.82 | 0.52 | 1.58 | A |
| Comparative Example 3-8 | 0.82 | 0.83 | 0.99 | B |
| Comparative Example 3-9 | 0.82 | 1.05 | 0.78 | B |
| Example 3-4 | 1.01 | 0.32 | 3.16 | A |
| Example 3-5 | 1.01 | 0.52 | 1.94 | A |
| Example 3-6 | 1.01 | 0.83 | 1.22 | A |
| Comparative Example 3-10 | 1.01 | 1.05 | 0.96 | B |

The term is in Table 4 mean as follows.

Sa1: surface roughness Sa1 (unit: μm) of initial carrier

Sa2: surface roughness Sa2 (unit: μm) of replenishment carrier

Sa1/Sa2: ratio Sa1/Sa2

In each of Examples and each of Comparative Examples shown in Table 4, the packing volume Vp, the gap width DS, and the surface roughness Ra of the image bearing member were as follows.

Packing volume Vp: 62.5%

Gap width DS: 0.033 cm

Surface roughness Ra of image bearing member: 45 nm

As shown in Table 4, the ratio Sa1/Sa2 was less than 1.2 in each of the image forming apparatuses of Comparative Examples 3-1 to 3-10. Evaluation of trailing edge image roughness was rated as poor for the image forming apparatuses of Comparative Examples 3-1 to 3-10.

By contrast, the ratio Sa1/Sa2 was at least 1.2 and no greater than 3.4 in each of the image forming apparatuses of Examples 3-1 to 3-6 as shown in Table 4. As to the results of evaluation of carrier development, the results of evaluation of trailing edge image roughness, the results of evaluation of image pitch unevenness, and the results of evaluation of image grain fineness, all of Examples 3-1 to 3-6 were rated as good.

[Study 4: Packing volume Vp]

Packing volume Vp was studied next.

Initial developers to be used in Study 4 were prepared. In detail, the initial developers to be used in Study 4 were prepared according to the method described above in "Initial Developer Preparation Method" using the toner obtained in "Toner Preparation" described above and the carriers obtained in "Carrier Preparation" described above. In the preparation of the initial developers to be used in Study 4, carriers with the surface roughness Sa1 shown in Tables 6 and 7 were used among the carriers obtained in "Carrier Preparation" described above.

Replenishment developers to be used in Study 4 were prepared. In detail, the replenishment developers to be used in Study 4 were prepared according to the method described above in "Replenishment Developer Preparation Method" using the toner obtained in "Toner Preparation" described above and the carriers obtained in "Carrier Preparation" described above. In the preparation of the replenishment developers to be used in Study 4, carriers with the surface roughness Sa1 shown in Tables 6 and 7 and a surface roughness Sa2 obtained from the ratio Sa1/Sa2 being 1.75 were used among the carriers obtained in "Carrier Preparation" described above.

As shown in Table 5, the packing volume Vp was changed by changing the amount Y of developer conveyed.

TABLE 5

| Apparent density Z ($mg/cm^3$) | Gap width DS (cm) | Amount Y of developer conveyed ($mg/cm^2$) | Packing volume Vp (%) |
|---|---|---|---|
| 1600 | 0.033 | 13.3 | 25 |
| 1600 | 0.033 | 16.0 | 30 |
| 1600 | 0.033 | 23.5 | 45 |
| 1600 | 0.033 | 27.5 | 52 |
| 1600 | 0.033 | 33.0 | 63 |
| 1600 | 0.033 | 36.0 | 68 |
| 1600 | 0.033 | 39.5 | 75 |
| 1600 | 0.033 | 45.0 | 85 |
| 1600 | 0.033 | 47.5 | 90 |
| 1600 | 0.033 | 50.0 | 95 |

Note that each apparent density Z shown in Table 5 is an apparent density Z of an initial developer with a surface roughness Sa1 of 0.31 μm. In evaluation using each of the initial developers with a surface roughness Sa1 of one of 0.47 μm 0.53 μm 0.68 μm 0.77 μm 0.91 μm and 1.00 μm the amount Y of developer conveyed was adjusted as appropriate so that the packing volume Vp was as shown in Table 5 according to the value of the measured apparent density Z of the initial developer.

Carrier development, trailing edge image roughness, image pitch unevenness, and image grain fineness were evaluated for image forming apparatuses each including one of the initial developers and one of the replenishment developers according to the method described above in "Evaluation Methods". Results of evaluation of image pitch unevenness are shown in Table 6. Results of evaluation of image grain fineness are shown in Table 7. As to the results of evaluation of carrier development and the results of evaluation of trailing edge image roughness, all of Examples and Comparative Examples shown in Tables 6 and 7 were rated as A (good).

TABLE 6

| Pitch unevenness | Vp (%) | Sa1 (μm) 0.31 | 0.47 | 0.53 | 0.68 | 0.77 | 0.91 | 1.00 |
|---|---|---|---|---|---|---|---|---|
| Comparative Example 4-1 | 25 | A | A | A | A | A | A | A |
| Comparative Example 4-2 | 30 | A | A | A | A | A | A | A |
| Example 4-1 | 45 | A | A | A | A | A | A | A |
| Example 4-2 | 52 | A | A | A | A | A | A | A |
| Example 4-3 | 63 | A | A | A | A | A | A | A |
| Example 4-4 | 68 | A | A | A | A | A | A | A |
| Comparative Example 4-3 | 75 | B | B | B | B | B | B | B |
| Comparative Example 4-4 | 85 | B | B | B | B | B | B | B |
| Comparative Example 4-5 | 90 | B | B | B | B | B | B | B |
| Comparative Example 4-6 | 95 | B | B | B | B | B | B | B |

TABLE 7

| Grain fineness | Vp (%) | Sa1 (μm) 0.31 | 0.47 | 0.53 | 0.68 | 0.77 | 0.91 | 1.00 |
|---|---|---|---|---|---|---|---|---|
| Comparative Example 4-1 | 25 | B | B | B | B | B | B | B |
| Comparative Example 4-2 | 30 | B | B | B | B | B | B | B |
| Example 4-1 | 45 | A | A | A | A | A | A | A |
| Example 4-2 | 52 | A | A | A | A | A | A | A |
| Example 4-3 | 63 | A | A | A | A | A | A | A |
| Example 4-4 | 68 | A | A | A | A | A | A | A |
| Comparative Example 4-3 | 75 | A | A | A | A | A | A | A |
| Comparative Example 4-4 | 85 | A | A | A | A | A | A | A |
| Comparative Example 4-5 | 90 | A | A | A | A | A | A | A |
| Comparative Example 4-6 | 95 | A | A | A | A | A | A | A |

The terms in Tables 6 and 7 mean as follows.

Sa1: surface roughness Sa1 (unit: μm) of initial carrier

Vp: packing volume Vp (unit: %)

The ratio Sa1/Sa2 and the surface roughness Ra of each image bearing member in Examples and Comparative Examples shown in Tables 6 and 7 were as follows.

Ratio Sa1/Sa2:1.75

Surface roughness Ra of image bearing member: 45 nm

As shown in Table 6, the packing volume Vp of each of the image forming apparatuses of Comparative Examples 4-3 to 4-6 was greater than 70%. The image forming apparatuses of Comparative Examples 4-3 to 4-6 were rated as poor in image pitch unevenness.

As shown in Table 7, the packing volume Vp of each of the image forming apparatuses of Comparative Examples 4-1 and 4-2 was less than 40%. The image forming apparatuses of Comparative Examples 4-1 and 4-2 were rated as poor in image grain fineness.

By contrast, the packing volume Vp of each of the image forming apparatuses of Examples 4-1 to 4-4 was at least 40% and no greater than 70% as shown in Tables 6 and 7. As to the results of evaluation of carrier development, the results of evaluation of trailing edge image roughness, the results of evaluation of image pitch unevenness, and the results of evaluation of image grain fineness, all of Examples 4-1 to 4-4 were rated as good.

From the above, the image forming apparatus and the image formation method of the present disclosure, which encompass Examples as above, are determined to be able to form fine-grained images with less trailing edge image roughness and less pitch unevenness and inhibit carrier development.

What is claimed is:

1. An image forming apparatus comprising:
a developer;
a development device that develops an electrostatic latent image into a toner image with the developer; and
an image bearing member that carries the toner image, wherein
the developer includes an initial developer and a replenishment developer,
the development device includes:
an accommodation section that accommodates the developer including at least the initial developer;
a replenishment section that replenishes the accommodation section with the replenishment developer; and
a developer bearing member that is located opposite to the image bearing member with a space therebetween and that carries and conveys the developer accommodated in the accommodation section,
the initial developer contains an initial carrier and a toner,
the replenishment developer contains a replenishment carrier and the toner,
the initial carrier has a surface with an arithmetic mean roughness Sa1 of at least 0.3 μm and no greater than 1.0 μm,
a ratio Sa1/Sa2 of the arithmetic mean roughness Sa1 of the surface of the initial carrier to an arithmetic mean roughness Sa2 of a surface of the replenishment carrier is at least 1.2 and no greater than 3.4, and
a packing volume Vp calculated from equation (1) below is at least 40% and no greater than 70%:

$$Vp=100\times Y/(Z\times DS) \quad (1)$$

where in the equation (1),
Y represents an amount of the developer conveyed by the developer bearing member,
Z represents an apparent density of the initial developer, and
DS represents a width of the space between the developer bearing member and the image bearing member.

2. The image forming apparatus according to claim 1, wherein
the image bearing member has a surface with an arithmetic mean roughness Ra of at least 40 nm and no greater than 70 nm.

3. The image forming apparatus according to claim 1, wherein
the initial carrier contains first carrier particles, and
the first carrier particles each include a carrier mother particle and ferroelectric particles attached to a surface of the carrier mother particle.

4. The image forming apparatus according to claim 3, wherein
in the first carrier particles, the ferroelectric particles have a content ratio of at least 0.02 parts by mass and no greater than 0.22 parts by mass to 100.00 parts by mass of the carrier mother particles.

5. The image forming apparatus according to claim 3, wherein
the replenishment carrier contains second carrier particles,
the second carrier particles each include the carrier mother particle and the ferroelectric particles attached to the surface of the carrier mother particle of the second carrier particle, and a content of the ferroelectric particles relative to a mass of the carrier mother particles in the second carrier particles is smaller than a content of the ferroelectric particles relative to a mass of the carrier mother particles in the first carrier particles.

6. The image forming apparatus according to claim 5, wherein in the second carrier particles, the ferroelectric particles have a content ratio of at least 0.01 parts by mass and no greater than 0.16 parts by mass to 100.00 parts by mass of the carrier mother particles.

7. The image forming apparatus according to claim 3, wherein the ferroelectric particles are titanate compound particles.

8. The image forming apparatus according to claim 3, wherein the ferroelectric particles have a number average primary particle diameter of at least 20 nm and no greater than 50 nm.

9. An image formation method comprising developing an electrostatic latent image formed on a surface of an image bearing member into a toner image with a developer accommodated in a development device, wherein the developer includes an initial developer and a replenishment developer, the development device includes:

an accommodation section that accommodates the developer including at least the initial developer;

a replenishment section that replenishes the accommodation section with the replenishment developer; and a developer bearing member that is located opposite to the image bearing member with a space therebetween and that carries and conveys the developer accommodated in the accommodation section, the initial developer contains an initial carrier and a toner, the replenishment developer contains a replenishment carrier and the toner, the initial carrier has a surface with an arithmetic mean roughness Sa1 of at least 0.3 μm and no greater than 1.0 μm, a ratio Sa1/Sa2 of the arithmetic mean roughness Sa1 of the surface of the initial carrier to an arithmetic mean roughness Sa2 of a surface of the replenishment carrier is at least 1.2 and no greater than 3.4, and a packing volume Vp calculated from equation (1) below is at least 40% and no greater than 70%:

$$Vp=100\times Y/(Z\times DS) \quad (1)$$

where in the equation (1),

Y represents an amount of the developer conveyed by the developer bearing member, Z represents an apparent density of the initial developer, and DS represents a width of the space between the developer bearing member and the image bearing member.

* * * * *